(12) United States Patent
Wang

(10) Patent No.: US 12,013,471 B2
(45) Date of Patent: Jun. 18, 2024

(54) PRECISE OUTDOOR DISTANCE, SHAPE, AND LAND AREA MEASUREMENT WITH WIRELESS DEVICES

(71) Applicant: QUALCOMM Incorporated, San Diego, CA (US)

(72) Inventor: Min Wang, Tustin, CA (US)

(73) Assignee: QUALCOMM Incorporated, San Diego, CA (US)

( * ) Notice: Subject to any disclaimer, the term of this patent is extended or adjusted under 35 U.S.C. 154(b) by 278 days.

(21) Appl. No.: 17/342,415

(22) Filed: Jun. 8, 2021

(65) Prior Publication Data

US 2022/0390613 A1 Dec. 8, 2022

(51) Int. Cl.
| | | |
|---|---|---|
| *G01S 19/44* | (2010.01) | |
| *G01S 19/40* | (2010.01) | |
| *G01S 19/43* | (2010.01) | |
| *G01S 19/51* | (2010.01) | |

(52) U.S. Cl.
CPC .............. *G01S 19/44* (2013.01); *G01S 19/40* (2013.01); *G01S 19/43* (2013.01); *G01S 19/51* (2013.01)

(58) Field of Classification Search
CPC .......... G01S 19/40; G01S 19/43; G01S 19/44; G01S 19/13; G01S 19/51
USPC ............ 342/357.51, 357.27, 357.26, 357.23, 342/357.34
See application file for complete search history.

(56) References Cited

U.S. PATENT DOCUMENTS

| | | | | |
|---|---|---|---|---|
| 4,812,991 A | * | 3/1989 | Hatch ...................... | G01S 19/44 342/356 |
| 5,471,217 A | * | 11/1995 | Hatch ................... | G01S 19/426 342/357.27 |
| 5,523,763 A | * | 6/1996 | Loomis ................... | G01S 19/41 342/357.44 |
| 5,991,691 A | * | 11/1999 | Johnson ................... | G01S 19/15 342/357.53 |
| 6,397,147 B1 | * | 5/2002 | Whitehead .............. | G01S 19/41 701/472 |

(Continued)

FOREIGN PATENT DOCUMENTS

WO 2012128980 A1 9/2012

OTHER PUBLICATIONS

International Search Report and Written Opinion—PCT/US2022/025105—ISA/EPO—Jul. 11, 2022.

*Primary Examiner* — Chuong P Nguyen
(74) *Attorney, Agent, or Firm* — Thien T. Nguyen

(57) ABSTRACT

A wireless device determines a biased wireless device position and a receiver clock error for a plurality of satellites, the biased wireless device position and the receiver clock error being associated with a biased ambiguity. The wireless device calculates, upon determining the biased wireless device position and the receiver clock error, the biased ambiguity for each of the plurality of satellites. The wireless device applies the biased ambiguity to a carrier phase measurement for each of the plurality of satellites, the carrier phase measurement being associated with the receiver clock error and an absolute location of the wireless device. The wireless device determines, upon applying the biased ambiguity to the carrier phase measurement for each of the plurality of satellites, the absolute location of the wireless device based on the biased ambiguity for all of the plurality of satellites.

27 Claims, 11 Drawing Sheets

(56) References Cited

U.S. PATENT DOCUMENTS

| | | | | |
|---|---|---|---|---|
| 6,775,615 | B2* | 8/2004 | Yule | G01S 19/42 |
| | | | | 701/469 |
| 7,498,979 | B2* | 3/2009 | Liu | G01S 19/44 |
| | | | | 342/357.27 |
| 7,511,661 | B2* | 3/2009 | Hatch | G01S 19/41 |
| | | | | 342/357.31 |
| 7,679,555 | B2* | 3/2010 | Dai | G01S 19/41 |
| | | | | 342/357.31 |
| 7,982,667 | B2* | 7/2011 | Vollath | G01S 19/32 |
| | | | | 342/357.23 |
| 10,114,126 | B2* | 10/2018 | Wu | G01S 19/41 |
| 10,422,885 | B2* | 9/2019 | Dai | G01S 19/44 |
| 11,175,414 | B2* | 11/2021 | Zeitzew | G01S 19/43 |
| 11,550,065 | B2* | 1/2023 | Wang | G01S 19/43 |
| 2008/0165053 | A1* | 7/2008 | Liu | G01S 19/32 |
| | | | | 342/357.27 |
| 2016/0320493 | A1* | 11/2016 | Wu | G01S 19/41 |
| 2016/0377729 | A1* | 12/2016 | Jardak | G01S 19/33 |
| | | | | 342/357.27 |
| 2017/0269231 | A1* | 9/2017 | Dai | G01S 19/04 |
| 2018/0188378 | A1* | 7/2018 | Rapoport | G01S 19/40 |
| 2021/0278548 | A1* | 9/2021 | Berntorp | G01S 19/44 |
| 2022/0003879 | A1* | 1/2022 | Zeitzew | G01S 19/51 |
| 2023/0098682 | A1* | 3/2023 | Bao | H04W 64/00 |
| | | | | 455/456.1 |

* cited by examiner

PRECISE OUTDOOR DISTANCE, SHAPE, AND LAND AREA MEASUREMENT WITH WIRELESS DEVICES

TECHNICAL FIELD

The present disclosure relates generally to communication systems, and more particularly, to wireless communication involving positioning.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, an apparatus for wireless communication at a wireless device is provided. The apparatus includes a memory, a transceiver, and a processor communicatively connected to the memory and the transceiver. The processor is configured to determine a biased wireless device position and a receiver clock error for a plurality of satellites, the biased wireless device position and the receiver clock error being associated with a biased ambiguity. The processor is further configured to calculate, upon determining the biased wireless device position and the receiver clock error, the biased ambiguity for each of the plurality of satellites. The processor is further configured to apply the biased ambiguity to a carrier phase measurement for each of the plurality of satellites, the carrier phase measurement being associated with the receiver clock error and an absolute location of the wireless device. The processor is further configured to determine, upon applying the biased ambiguity to the carrier phase measurement for each of the plurality of satellites, the absolute location of the wireless device based on the biased ambiguity for all of the plurality of satellites.

In an aspect of the disclosure, a method for wireless communication at a wireless device is provided. The method includes determining a biased wireless device position and a receiver clock error for a plurality of satellites, the biased wireless device position and the receiver clock error being associated with a biased ambiguity. The method may further include calculating, upon determining the biased wireless device position and the receiver clock error, the biased ambiguity for each of the plurality of satellites. The method may further include applying the biased ambiguity to a carrier phase measurement for each of the plurality of satellites, the carrier phase measurement being associated with the receiver clock error and an absolute location of the wireless device. The method may further include determining, upon applying the biased ambiguity to the carrier phase measurement for each of the plurality of satellites, the absolute location of the wireless device based on the biased ambiguity for all of the plurality of satellites.

In another aspect of the disclosure, an apparatus for wireless communication at a wireless device is provided. The apparatus includes means for determining a biased wireless device position and a receiver clock error for a plurality of satellites, the biased wireless device position and the receiver clock error being associated with a biased ambiguity. The apparatus includes means for means for calculating, upon determining the biased wireless device position and the receiver clock error, the biased ambiguity for each of the plurality of satellites. The apparatus includes means for applying the biased ambiguity to a carrier phase measurement for each of the plurality of satellites, the carrier phase measurement being associated with the receiver clock error and an absolute location of the wireless device. The apparatus includes means for determining, upon applying the biased ambiguity to the carrier phase measurement for each of the plurality of satellites, the absolute location of the wireless device based on the biased ambiguity for all of the plurality of satellites.

In another aspect of the disclosure, a non-transitory computer-readable storage medium storing computer executable code for wireless communication at a wireless device is provided. The code when executed by a processor causes the processor to determine a biased wireless device position and a receiver clock error for a plurality of satellites, the biased wireless device position and the receiver clock error being associated with a biased ambiguity. The code may further cause the processor to calculate, upon determining the biased wireless device position and the receiver clock error, the biased ambiguity for each of the plurality of satellites. The code may further cause the processor to apply the biased ambiguity to a carrier phase measurement for each of the plurality of satellites, the carrier phase measurement being associated with the receiver clock error and an absolute location of the wireless device. The code may further cause the processor to determine, upon applying the biased ambiguity to the carrier phase measurement for each of the plurality of satellites, the absolute location of the wireless device based on the biased ambiguity for all of the plurality of satellites.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
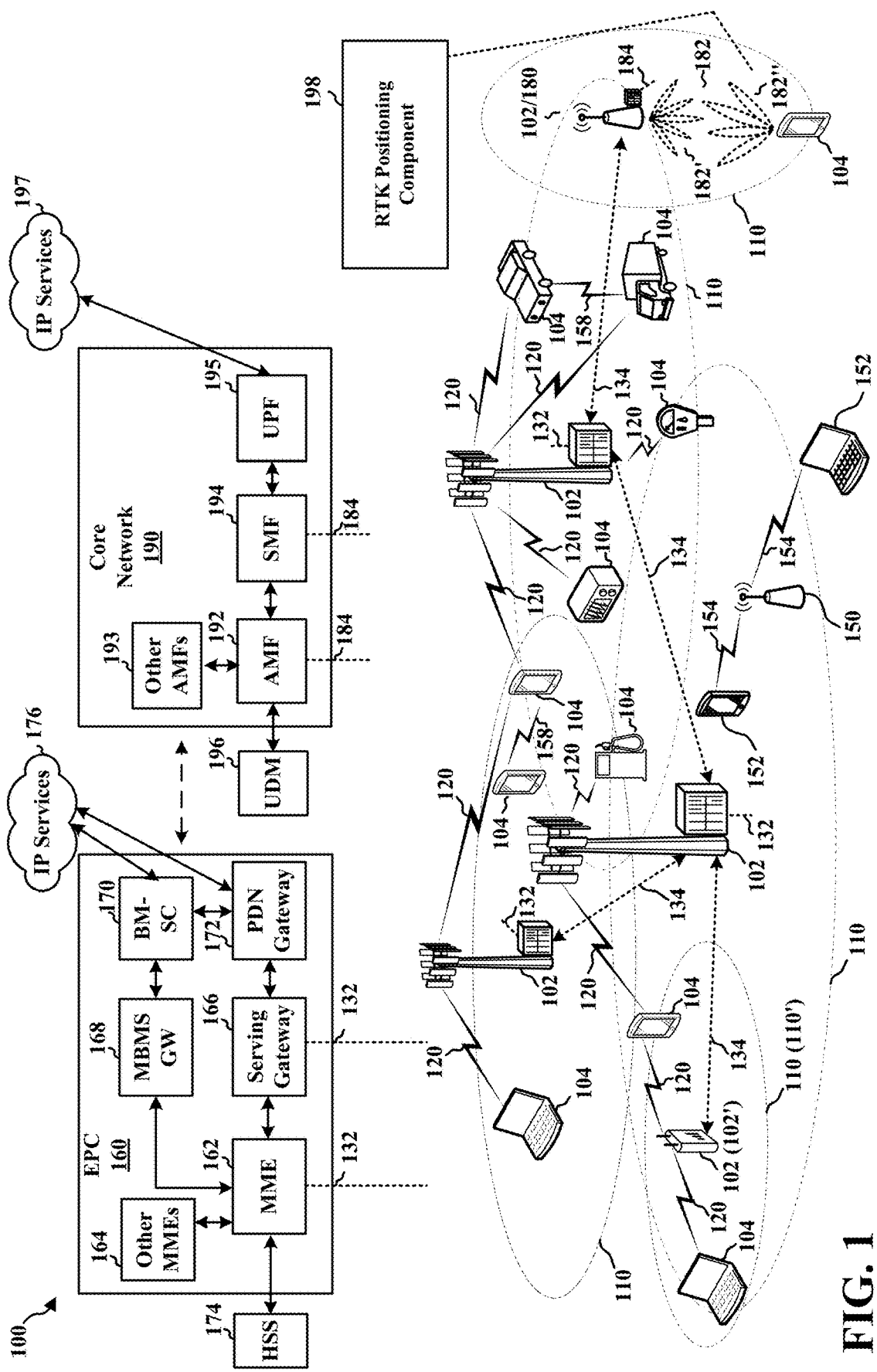
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

Aspects presented herein may provide an RTK positioning mode without an initialization time. Aspects presented herein may enable mobile devices, such as mobile devices without high-end antenna (e.g., mobile phones, smart watches, etc.), to achieve very accurate relative positioning accuracy before or without ambiguity for RTK is resolved/converged.

In certain aspects, the UE 104 may include an RTK positioning component 198 configured to determine a relative location of the UE 104 before or without the integer ambiguity associated with the RTK positioning being resolved/converged. In one configuration, the RTK positioning component 198 may be configured to determine a biased wireless device position and a receiver clock error for a plurality of satellites, the biased wireless device position and the receiver clock error being associated with a biased ambiguity. In such configuration, the RTK positioning component 198 may calculate, upon determining the biased wireless device position and the receiver clock error, the biased ambiguity for each of the plurality of satellites. In such configuration, the RTK positioning component 198 may apply the biased ambiguity to a carrier phase measurement for each of the plurality of satellites, the carrier phase measurement being associated with the receiver clock error and an absolute location of the wireless device. In such configuration, the RTK positioning component 198 may determine, upon applying the biased ambiguity to the carrier phase measurement for each of the plurality of satellites, the absolute location of the wireless device based on the biased ambiguity for all of the plurality of satellites.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., Si interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2:
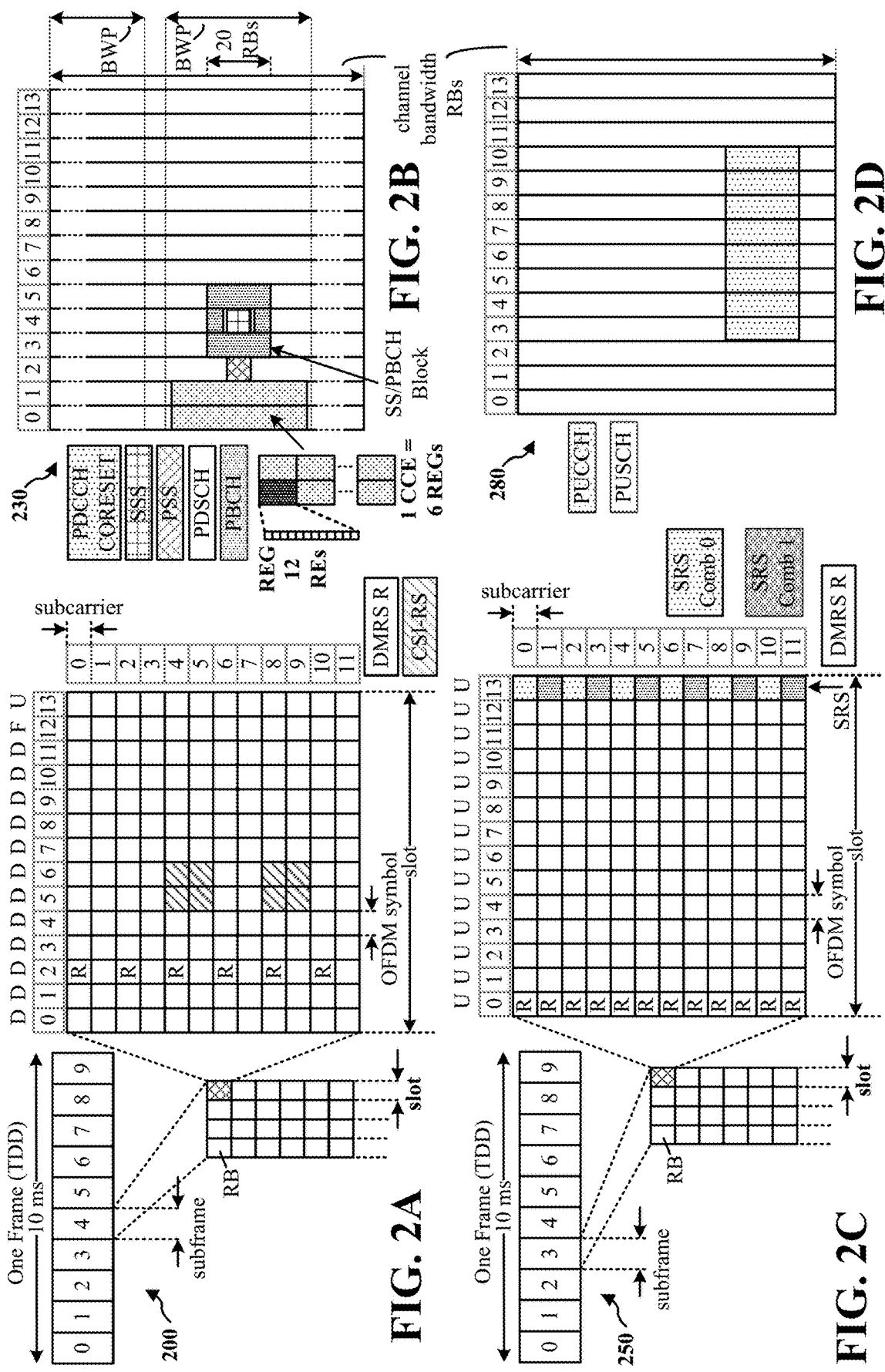
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS Δf = $2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology p, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
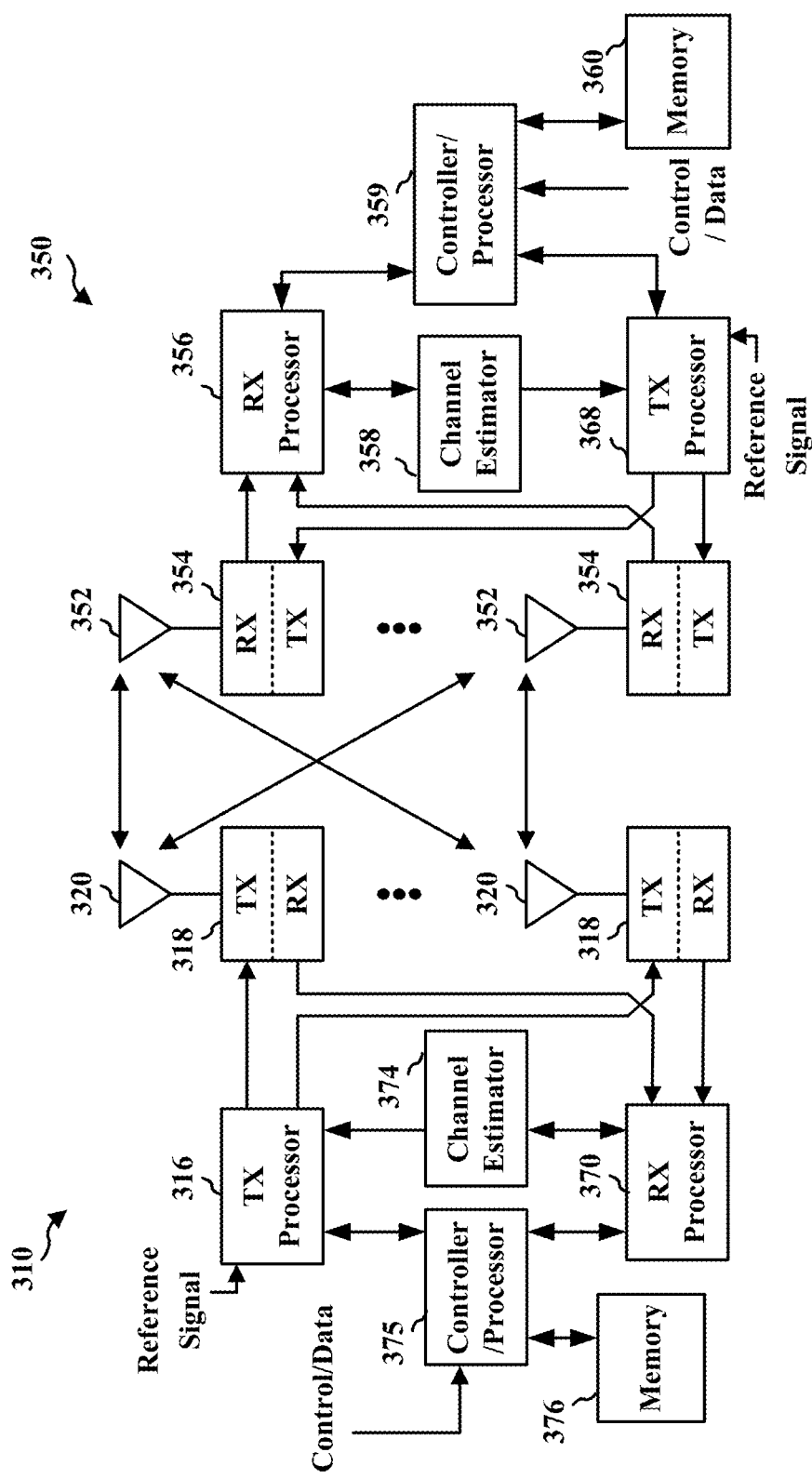
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the RTK positioning component 198 of FIG. 1.

A wireless device, such as a mobile phone, an automobile, a smart watch, etc., may be able to determine its location on the Earth based on global navigation satellite systems (GNSS). For example, the Global Positioning System (GPS) is a satellite-based radio navigation system that is capable of providing geolocation and time information to a GPS receiver anywhere on or near the Earth where there is a line of sight (LOS) to four or more GPS satellites. If there are obstacles such as physical structures (e.g., buildings, bridges) and terrains (e.g., mountains) between the GPS satellites and the GPS receiver, the GPS signals received by the GPS receiver may be weakened and/or include an offset/delay.

Figure 4:
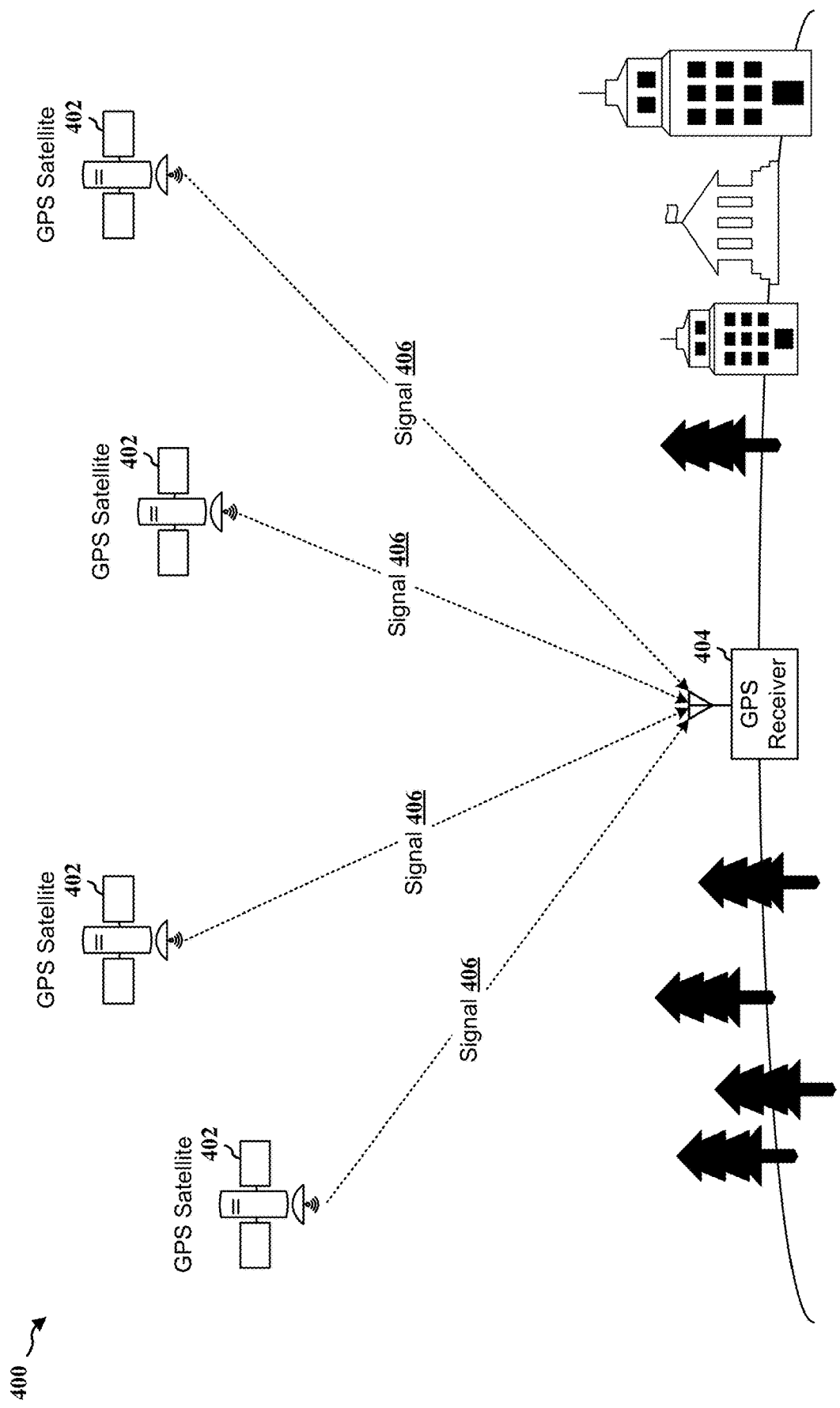
FIG. 4 is a diagram illustrating an example of a Global Positioning System (GPS) positioning in accordance with various aspects of the present disclosure.

FIG. 4 is a diagram 400 illustrating an example of GPS positioning in accordance with various aspects of the present disclosure. A GPS receiver 404 may calculate its position and time based at least in part on data received from multiple GPS satellites 402, where each GPS satellite 402 may carry a record of its position and time and may transmit that data (e.g., the record) to the GPS receiver 404. Each GPS satellite 402 may further include a clock that is synchronized with other clocks of GPS satellites and with ground clock(s). If a GPS satellite 402 detects that there is a drift from the time maintained on the ground, the GPS satellite 402 may correct it. The GPS receiver 404 may also include a clock, but the clock for the GPS receiver 404 may be less stable and precise compared to the clocks for the GPS satellites 402.

As the speed of radio waves may be constant and independent of the satellite speed, a time delay between a time the GPS satellite 402 transmits a signal 406 and a time the GPS receiver 404 receives the signal 406 may be proportional to the distance from the GPS satellite 402 to the GPS receiver 404. In some examples, a minimum of four GPS satellites may be used by the GPS receiver 404 to compute/calculate one or more unknown quantities (e.g., three position coordinates and clock deviation from satellite time, etc.).

Each GPS satellite 402 may continually broadcast the signal 406 (e.g., a carrier wave with modulation) that may include a pseudorandom code (e.g., a sequence of ones and zeros) that may be known to the GPS receiver 404, and may also include a message that includes a time of transmission and the satellite position at that time. In other words, each signal 406 may carry two types of information: time and carrier wave (e.g., a modulated waveform with an input signal to be electromagnetically transmitted). Based on the signals 406 received from the GPS satellites 402, the GPS receiver 404 may measure the time of arrivals (TOAs) of the signals 406 and calculate the time of flights (TOFs) for the signals 406. Then, based on the TOFs, the GPS receiver 404 may compute its three-dimensional position and clock deviation, and the GPS receiver 404 may determine its position on the Earth. For example, the GPS receiver 404's location may be converted to a latitude, a longitude, and a height relative to an ellipsoidal Earth model. These coordinates may be displayed, such as on a moving map display, or recorded or used by some other system, such as a vehicle guidance system.

While the distance between a GPS receiver and a GPS satellite may be calculated based on the time it takes for a signal, the GPS satellite's signal sequence may be delayed in relation to the GPS receiver's sequence. Thus, in some examples, a delay may be applied to the GPS receiver's sequence, such that the two sequences are aligned. For example, to calculate the delay, a GPS receiver may align a pseudorandom binary sequence contained in the GPS satellite's signal to an internally generated pseudorandom binary sequence. As the GPS satellite signal takes time to reach the receiver, the satellite's sequence may be delayed in relation to the receiver's sequence. By increasingly delaying the receiver's sequence, the two sequences may eventually be aligned.

The accuracy of GPS positioning may depend on various factors, such as satellite geometry, signal blockage, atmospheric conditions, and/or receiver design features/quality, etc. For example, GPS receivers used by smartphones or smart watches may have an accuracy lower than GPS receivers used by vehicles and surveying equipment.

To improve the accuracy of GPS positioning (e.g., from meters to centimeters), a real time kinematics (RTK) technique or mechanism may be used for a positioning device. RTK is a technique or mechanism that may be used by a positioning device (e.g., a UE, a surveying equipment, an automobile GPS, etc.) to improve the accuracy of positioning. For example, based on RTK, a positioning device (e.g., a client device) may use a base station's correction information to mitigate several error sources in GPS receiver PR and CP measurement of the positioning device, which may include satellite orbit, satellite clock, atmospheric error, etc. Thus, better accuracy may be achieved by the positioning device.

Figure 5:
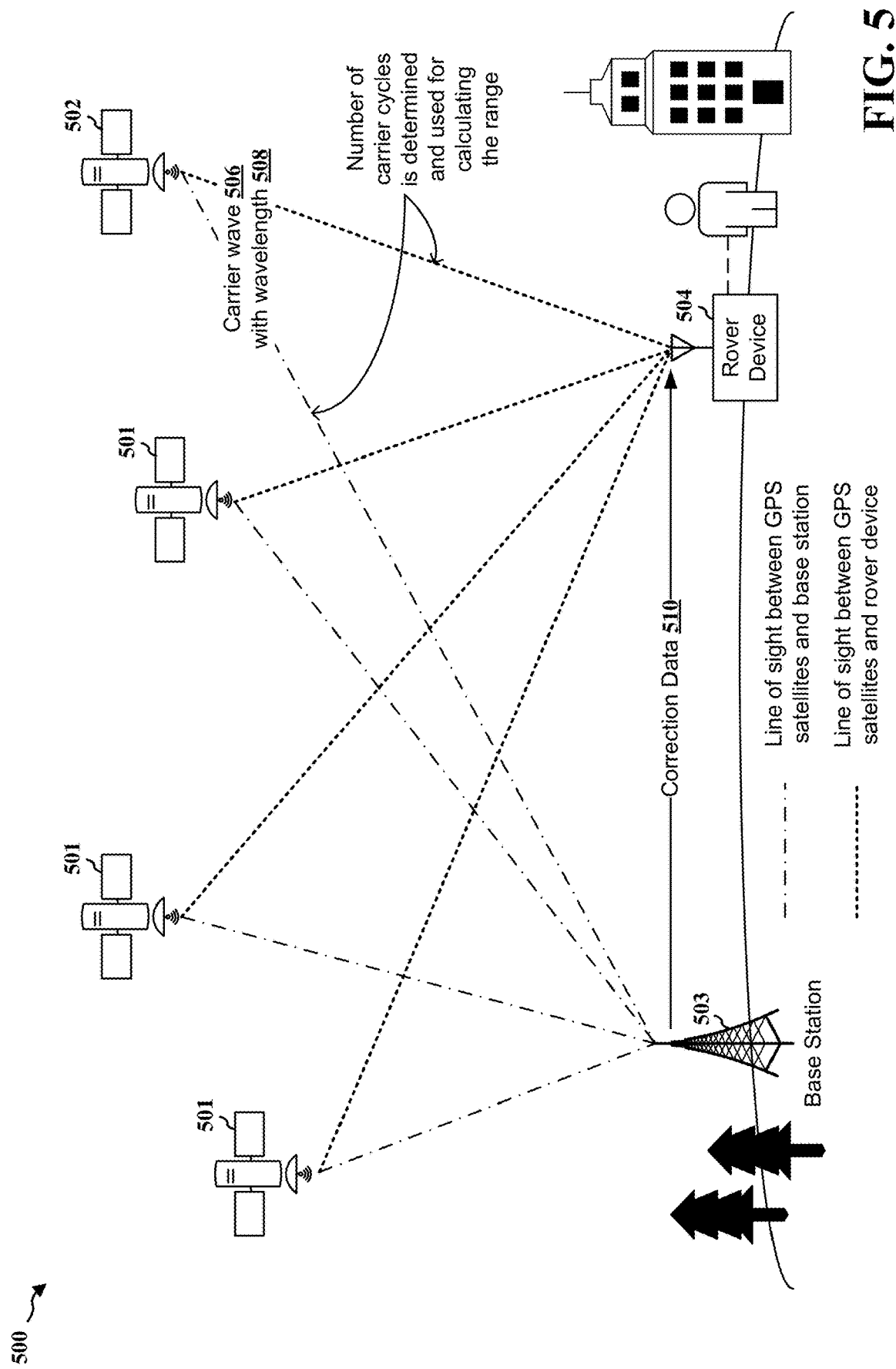
FIG. 5 is a diagram illustrating an example of a real time kinematics (RTK) positioning in accordance with various aspects of the present disclosure.

FIG. 5 is a diagram 500 illustrating an example of an RTK positioning in accordance with various aspects of the present disclosure. In one example, at least two receivers may be used in association with the RTK positioning, where at least one of the receivers may be stationary, which may be referred to as a base station 503, and at least one other receiver may be mobile (e.g., may move freely), which may be referred to as a rover or a rover device 504 (e.g., a GNSS/GPS receiver, a UE, a rover station, etc.). In other words, an RTK system may include a base station and a rover, where the base station may be a stationary receiver whose location is known.

A range between a satellite 502 (e.g., a GNSS/GPS satellite) and the rover device 504 or between the satellite 502 and the base station 503 may be calculated by determining a number of carrier cycles between the satellite 502 and the rover device 504 or the base station 503, and multiplying this number by the carrier wavelength 508 of a carrier wave 506 (e.g., a carrier signal) transmitted by the satellite 502. For example, if the satellite 502 is transmitting a carrier wave 506 with a wavelength 508 of ten (10) meters, and the rover device 504 receives the carrier wave 506 and determines that there are five hundred (500) carrier cycles between the satellite 502 and the rover device 504, then the rover device 504 may calculate the distance between the satellite 502 and the rover device 504 by multiplying the number of carriers cycles determined (e.g., 500) with the carrier wavelength 508 (e.g., 10 meters), which may be five thousand meters (e.g., 500×10=5000). Similarly, the base station 503 may also receive the carrier wave 506 from the satellite 502 and determine its ranges from the satellite 502 based on the wavelength 508 of the carrier wave 506 and the number of carrier cycles between the base station 503 and the satellite 502. The rover device 504 and/or the base station 503 may calculate ranges (e.g., distances) between the rover device 504/base station 503 and multiple (e.g., four or more) satellites (e.g., satellites 501 and 502) to determine their geographical locations (e.g., their locations on the Earth).

During the RTK positioning, the rover device 504 (e.g., a UE, a client device, etc.) may undergo an "ambiguity resolution" process to determine the number of carrier cycles between a satellite 502 and the rover device 504. In other words, when the rover device 504 receives a carrier wave from a satellite 502, it may take time for the rover device 504 to figure out how many carrier cycles are between the satellite 502 and the rover device 504. In some examples, a GNSS receiver with more sophisticated or high-end antenna/hardware, such as an automotive grade antenna, may be able to resolve the ambiguity within a relatively short time (e.g., within seconds), while a GNSS receiver with less sophisticated or low-end antenna/hardware, such as antenna for mobile phone, and/or a smart watch, may take a longer time (e.g., 10-30 minutes or more) to resolve the ambiguity. In some examples, the ambiguity may also be referred to as an "integer ambiguity."

In some examples, ranges calculated by the rover device 504 may include errors due to satellite clock and ephemerides, and ionospheric and tropospheric delays, etc. Also, as the rover device 504 is more likely to be moving, the quality of a signal/carrier wave received from each satellite may change as the rover device moves from one location to another location. For example, if the rover device 504 moves from an open sky area to an area with buildings, signals from one or more satellites 501/502 may be blocked/reflected by the buildings. As such, ranges calculated by the rover device 504 may start to drift and may include error(s).

On the other hand, as the base station 503 is likely to be stationary with a known location, and the base station 503 may be equipped with a more sophisticated and high-end GNSS receiver, the base station 503 may be able to maintain an accurate calculation for the ranges compared to the rover device 504. For example, the base station 503 may be configured to locate at a site (e.g., an open sky area) that has minimal environmental effects such as interference and multipath. As such, under the RTK positioning, the base station 503 may be configured to calculate its location by using the signal received from satellites (e.g., the satellites 501/502) based on the carrier phase measurement, then the base station 503 may compare the calculated location to its known location to identify if there are any errors. If the base station 503 identifies that there are errors, the base station 503 may generate a correction data 510 (or a correction signal) and transmit the correction data 510 to the rover device 504 to assist the rover device 504 in correcting the errors. For example, as the rover device 504 may typically be configured to locate in proximity to the base station 503 (e.g., within 6 miles, 12 miles, etc.), the rover device 504 is likely to encounter similar errors (e.g., similar ionospheric and tropospheric delays) as the base station 503. Thus, the rover device 504 may use the correction data 510 from the base station 503 to improve its own computed position from the GNSS constellations to achieve centimeter precision. In other words, a base station may be configured to stay in a fixed/known location and send correction data to one or more rover devices, and the one or more rover devices may use the correction data to increase the precision of their positioning and also the speed of error correction. As such, the rover device 504 may determine its position using algorithms that incorporate ambiguity resolution and differential correction. The position accuracy achievable by the rover device 504 may depend on its distance from the base station 503 and the accuracy of the differential corrections (e.g., the correction data 510).

In some examples, an RTK positioning may also be used in association with a network, where positioning data from one or more fixed base stations (e.g., the base station 503) may be transmitted to a central processing station. When requested by a rover device (which may transmit its approximate location to the central processing station), the central station may calculate and transmit correction information (e.g., the correction data 510) or a corrected position to the rover device.

In one example, a rover device (r) (e.g., the rover device 504) may obtain raw GNSS measurements (e.g., raw pseudo-range (PR) and raw carrier phase (CP) measurements) associated with one or more GNSS satellites based on:

$$P_r = \rho_r + dT_r - dt + d\text{Trop}_r + d\text{Iono}_r + \epsilon_{P_r}, \text{ and}$$

$$\Phi_r = \rho_r + dT_r - dt + d\text{Trop}_r - d\text{Iono}_r + \lambda \cdot N_r + \epsilon_{\Phi_r},$$

where P may indicate PR measurement (m), Φ may indicate CP measurement (m), ρ may indicate geometry range (m), dT may indicate receiver clock (m), dt may indicate satellite clock error (m), dTrop may indicate tropospheric error (m), dIono may indicate ionospheric error (m), λ may indicate wavelength (m), N may indicate integer ambiguity (which may be a constant value if no loss of lock occurs (cycle)), and c may indicate measurement noise and multipath.

After the correction data (e.g., correction data 510) is received from a base station (b) (e.g., while the GNSS correction from the base station (b) is available), the satellite clock error may be removed, and the troposphere and ionospheric error may virtually be canceled out when the base station (b) and the rover device (r) are close enough. Thus, the GNSS measurements after applying the base station correction data for the rover device (r) may become:

$$\Delta P_{b,r} = \Delta \rho_{b,r} + \Delta dT_{b,r} + \Delta \epsilon_{P_{b,r}}$$

$$\Delta \Phi_{b,r} = \Delta \rho_{b,r} + \Delta dT_{b,r} + \lambda \cdot \Delta N_{b,r} + \Delta \epsilon_{\Phi_{b,r}}$$

As discussed in connection with FIGS. 4 and 5, for industrial and/or household applications to precisely measure outdoor distance, shape of object, land area, etc. (e.g., cm to dm level accuracy), special commercial-grade tools and/or high-end GNSS receivers may be used by these applications. However, commercial-grade tools and/or high-end GNSS receivers may be relatively expensive and impractical for some devices, such as a mobile phone (e.g., due to antenna/hardware size limitation). Thus, to improve the positioning accuracy for wireless devices that are equipped with less sophisticated GNSS receivers/antenna (e.g., consumer grade GNSS receivers), such as mobile phones and smart watches, the wireless devices may be configured to apply or use an RTK mechanism, where the wireless devices may receive RTK correction data from a base station and/or a central processing station to assist its positioning, such as described in connection with FIG. 5.

However, in some examples, a device (e.g., a vehicle GPS device, a mobile phone, etc.) employing an RTK mechanism may have to wait until the ambiguity is fixed (e.g., may be referred to as an "initialization time") before the device is able to achieve a very high accuracy (e.g., mm to cm accuracy), such as described in connection with FIG. 5. The initialization time for different devices may vary depending on the satellite geometry, environment, and/or hardware (e.g., the GNSS antenna type). In other words, during an RTK procedure, the unknown estimation states in the Extended Kalman Filter (EKF) may include rover device position, rover device receiver clock, and the ambiguity term. For an RTK mechanism to be able to take the benefit of highly accurate carrier phase measurement and output the estimated rover device position at decimeter or centimeter accuracy, the RTK mechanism may be configured to wait until the estimated ambiguity term is fixed to an integer (e.g., by using Integer Ambiguity Resolution (IAR) techniques such as a LAMBDA method), or until the estimated ambiguity term is converged to a stable value along with the change associated with satellite line of sight geometry, etc. Such ambiguity fixing time or ambiguity convergence time may be defined as the "initialization time" of the RTK.

For a device connected with a high-end GNSS antenna, in an open sky environment, the RTK initialization time may be within seconds. However, for a device connected to a less sophisticated GNSS antenna (e.g., a consumer grade antenna, low-cost phone linear antenna, etc.), it may be more difficult to conduct IAR to achieve ambiguity fixing within seconds, where a longer convergence time may be applied to allow the ambiguity terms to be converged to a stable value along with the change associated with the satellite line of sight geometry before achieving decimeter to centimeter positioning accuracy. In some examples, depending on the satellite geometry, environment or hardware, the convergence time or the initialization time may take more than 10 minutes.

Figures 6A, 6B:
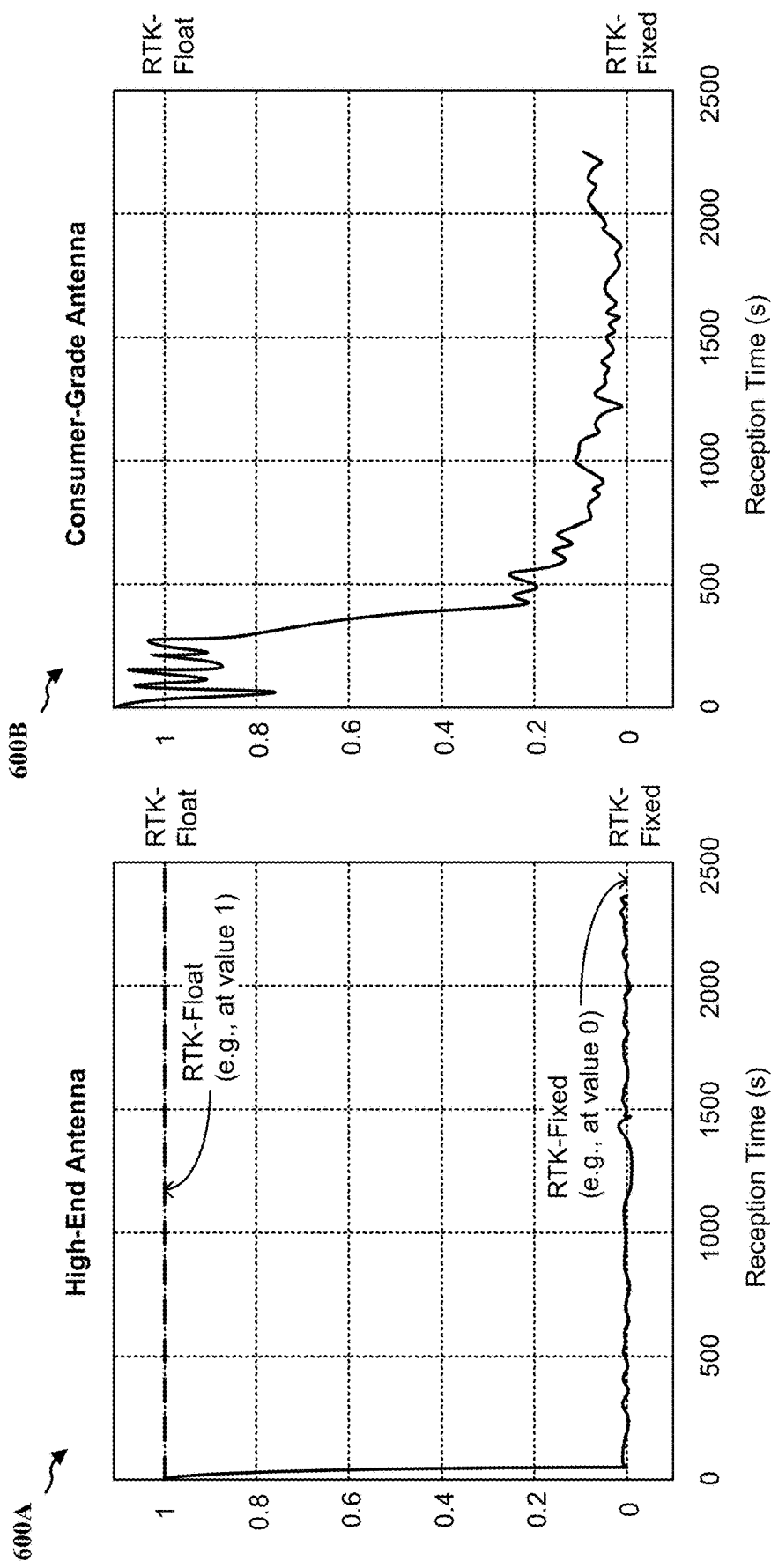
FIGS. 6A and 6B are diagrams illustrating examples of initialization time for different antennas in accordance with various aspects of the present disclosure.

FIGS. 6A and 6B are diagrams 600A and 600B illustrating examples of an initialization time for different antennas in accordance with various aspects of the present disclosure, where "RTK-Float" (e.g., at value one (1)) may indicate that the RTK ambiguity has not been fixed and "RTK-Fixed" (e.g., at value zero (0)) may indicate that the RTK ambiguity has been fixed. As shown by the diagram 600A, for a device equipped with high-end antenna (e.g., antenna for vehicles, base station, etc.), the ambiguity may be resolved within seconds after a satellite signal is received, e.g., it takes a few seconds for the high-end antenna to converge from RTK-Float to RTK-Fixed. Thus, the initialization time for the high-end antenna may be within seconds. On the other hand, as shown by the diagram 600B, for a device equipped with consumer-grade antenna (e.g., antenna for mobile phones, smart watches, etc.), it may take more than 500 seconds for the device to resolve the ambiguity (or to nearly resolve the ambiguity) after a satellite signal is received. In some examples, RTK may not fix the ambiguity for some GNSS antennas (e.g., low-cost cell phone antennas). Thus, the initialization time for the consumer-grade antenna may be more than ten minutes or longer, which may not be practical for some applications or in some scenarios.

Aspects presented herein may provide an RTK positioning mode without an initialization time (hereafter may be referred to as a "proposed RTK mode"). Aspects presented herein may enable mobile devices, such as mobile devices without a high-end antenna (e.g., mobile phones, smart watches, etc.), to achieve very accurate relative positioning accuracy before or without ambiguity for RTK being resolved/converged. For example, in one aspect of the present disclosure, an RTK mode without an initialization time may be provided to a mobile device (e.g., a mobile phone without high-end antenna), where the RTK mode without an initialization time may enable the mobile device to perform precise outdoor distance, shape, land area measurements before or without resolving the ambiguity (e.g., without waiting the ambiguity to be resolved). Although the absolute position solution may be biased under the proposed RTK mode, a very accurate relative positioning accuracy may be provided by the proposed RTK mode.

Figure 7:
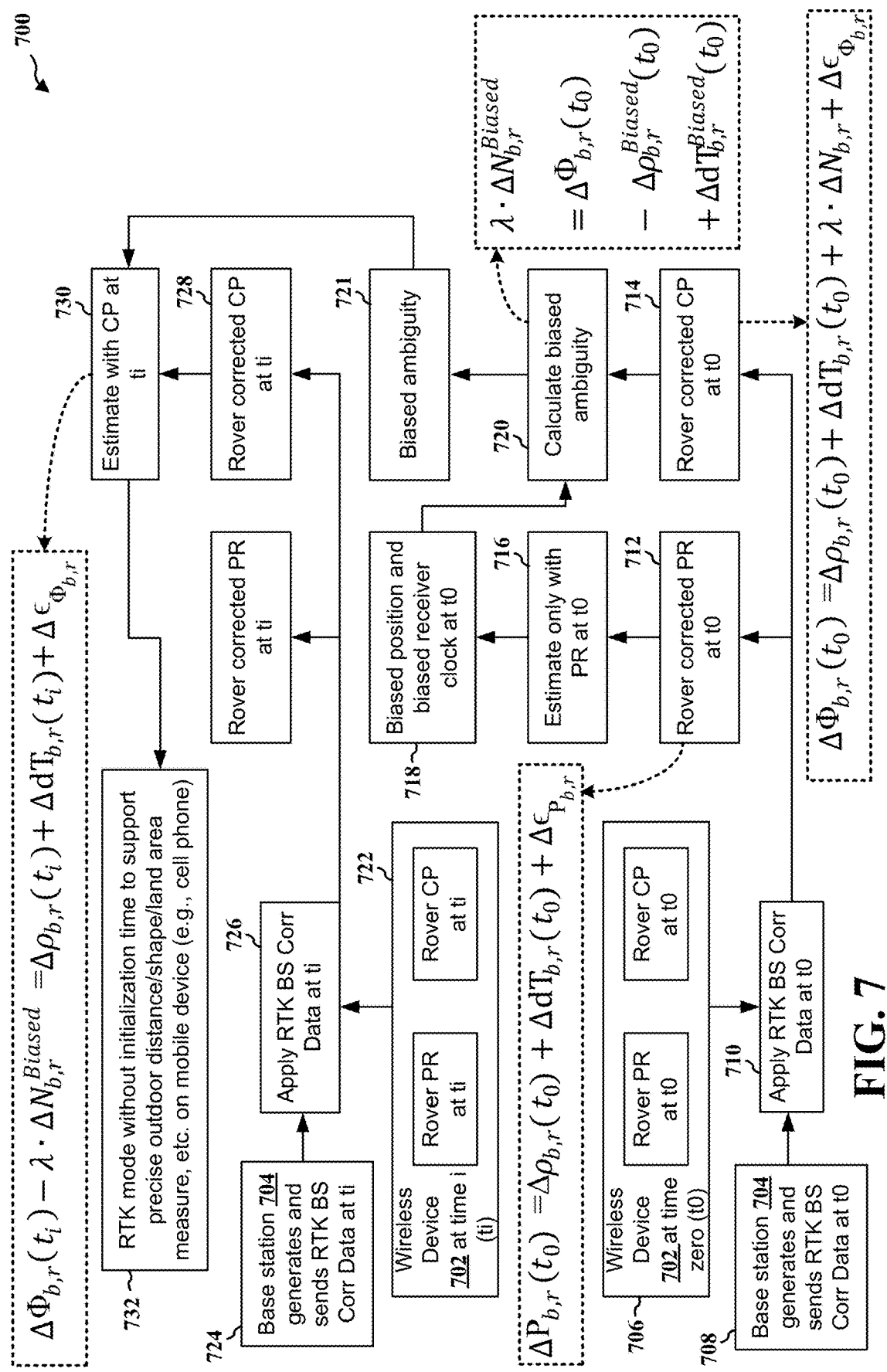
FIG. 7 is a flowchart illustrating an example of a wireless device (e.g., a rover device) applying an RTK positioning mode without an initialization time for determining relative positioning in accordance with various aspects of the present disclosure.

FIG. 7 is a flowchart 700 illustrating an example of a wireless device (e.g., a rover device) applying an RTK positioning mode without an initialization time for determining relative positioning in accordance with various aspects of the present disclosure.

At 706, a wireless device 702 (e.g., a rover device, a mobile phone, a smart watch, etc.) may receive signals from a plurality of satellites (e.g., GNSS/GPS satellites) at a first point in time (e.g., time zero (t0)), and the wireless device 702 may calculate a raw PR and a raw CP for the plurality of satellites. In one example, the raw PR may be calculated based on:

$$P_r = \rho_r + dT_r - dt + dTrop_r + dIono_r + \epsilon_{P_r}$$

where $P_r$ may indicate a PR measurement between the wireless device 702 and the plurality of satellites, $\rho_r$ may indicate a geometry range between the wireless device 702 and the plurality of satellites, $dT_r$ may indicate a receiver clock, dt may indicate a satellite clock error, $dTrop_r$ may indicate a tropospheric error, $dIono_r$ may indicate an ionospheric error, and $\epsilon_{P_r}$ may indicate a measurement noise and multipath associated with the PR. The raw CP may be calculated based on:

$$\Phi_r = \rho_r + dT_r - dt + dTrop_r - dIono_r + \lambda \cdot N_r + \epsilon_{\Phi_r}$$

where $\Phi_r$ may indicate a CP measurement between the wireless device 702 and the plurality of satellites, $\rho_r$ may indicate a geometry range between the wireless device 702 and the plurality of satellites, $dT_r$ may indicate a receiver clock, dt may indicate a satellite clock error, $dTrop_r$ may indicate a tropospheric error, $dIono_r$ may indicate an ionospheric error, $\lambda$ may indicate a wavelength, $N_r$ may indicate an integer ambiguity, and $\epsilon_{\Phi_r}$ may indicate a measurement noise and multipath associated with the raw CP.

At 708, a base station 704 may generate an RTK base station correction data (e.g., the correction data 510) at the first point in time (t0), and the base station 704 may transmit the generated RTK base station correction data to the wireless device 702 to assist the wireless device 702, such as described in connection with FIG. 5. The RTK base station correction data may include correction information associated with the biased wireless device position and the receiver clock error. Note that the use of numberings "704," "706," "708," and so forth does not specify a particular temporal order.

At 710, the wireless device 702 may apply the received RTK base station correction data to the raw PR and the raw CP at the first point in time (t0) to estimate the biased wireless device position and the receiver clock error.

At 712, after applying the RTK base station correction data, a difference in PR measurements at the first point in time (t0) (e.g., the raw PR after applying the correction data) may be represented by:

$$\Delta P_{b,r}(t_0) = \Delta \rho_{b,r}(t_0) + \Delta dT_{b,r}(t_0) + \epsilon_{P_{b,r}},$$

where $\Delta P_{b,r}$ may indicate a difference in PR measurements between the wireless device 702 and the base station 704 at the first point in time, $\Delta \rho_{b,r}(t_0)$ may indicate a difference in geometry range measurements between the wireless device 702 and the base station 704 at the first point in time, $\Delta dT_{b,r}(t_0)$ may indicate a difference in a receiver clock between the wireless device 702 and the base station 704 at the first point in time, and $\Delta \epsilon_{P_{b,r}}$ may indicate a difference in measurement noise and multipath associated with the PR between the wireless device 702 and the base station 704 (e.g., associated with wireless device PR measurements and base station PR measurements).

At 714, after applying the RTK base station correction data, a difference in CP measurements at the first point in time ($t_0$) (e.g., the raw CP after applying the correction data) may be represented by:

$$\Delta \Phi_{b,r}(t_0) = \Delta \rho_{b,r}(t_0) + \Delta dT_{b,r}(t_0) + \lambda \cdot \Delta N_{b,r} + \Delta \epsilon_{\Phi_{b,r}},$$

where $\Delta \Phi_{b,r}(t_0)$ may indicate a difference in CP measurements between the wireless device 702 and the base station 704 at the first point in time, $\Delta \rho_{b,r}(t_0)$ may indicate a difference in geometry range measurements between the wireless device 702 and the base station 704 at the first point in time, $\Delta dT_{b,r}(t_0)$ may indicate a difference in a receiver clock between the wireless device 702 and the base station 704 at the first point in time, $\Delta N_{b,r}$ may indicate a difference in an integer ambiguity between the wireless device 702 and the base station 704, and $\Delta \epsilon_{\Phi_{b,r}}$ may indicate a difference in measurement noise and multipath associated with the raw CP between the wireless device 702 and the base station 704 (e.g., associated with wireless device CP measurements and base station CP measurements).

At 716, the rover device 702 may estimate its position and the receiver clock based on the corrected PR obtained at 712. Then, at 718, the wireless device 702 may determine a biased wireless device position and a receiver clock error (e.g., a biased receiver clock) for the plurality of satellites. While the wireless device position and receiver clock may be estimated, because of the inaccuracy of the PR measurement and the ambiguity term has not converged, the estimated wireless device position and receiver clock may be inaccurate. Thus, for purposes of the present disclosure, the estimated wireless device position at t0 may be referred to as "biased position," "biased wireless device position," and/or "biased rover device position," etc., and the estimated receiver clock at t0 may be referred to as "biased receiver clock," "receiver clock error," and/or "biased wireless device clock," etc.

At 720, based on the determined biased wireless device position, the receiver clock error, and the difference in CP measurements obtained at 714, the wireless device 702 may calculate a biased ambiguity for each of the plurality of satellites. In other words, the biased wireless device position and the receiver clock error may be associated with a biased ambiguity. In one example, by using the "biased rover device position" and "biased receiver clock," the biased ambiguity may be determined based on:

$$\lambda \cdot \Delta N_{b,r}^{Biased} = \Delta \Phi_{b,r}(t_0) - [\Delta \rho_{b,r}^{Based}(t_0) + \Delta dT_{b,r}^{Biased}(t_0)],$$

where $\Delta \Phi_{b,r}(t_0)$ may indicate a difference in CP measurements between the wireless device 702 and the base station 704 at the first point in time, $\Delta \rho_{b,r}^{Biased}(t_0)$ may indicate a difference in geometry range measurements between the wireless device 702 and the base station 704 at the first point in time that is biased, $\Delta dT_{b,r}^{Biased}(t_0)$ may indicate a difference in a receiver clock between the wireless device 702 and the base station 704 at the first point in time that is biased, $\Delta N_{b,r}^{Biased}$ may indicate a difference in an integer ambiguity between the wireless device 702 and the base station 704 that is biased, and $\lambda$ may indicate the wavelength.

Then, at 721, the wireless device 702 may apply the calculated "biased ambiguity" to determine its relative location at a second point in time (e.g., time i (ti)). For example, at 722, the wireless device 702 may receive signals from a plurality of satellites at the second point in time (ti), and the wireless device 702 may calculate a raw PR and a raw CP for the plurality of satellites, such as described in connection with 708. At 724, the base station 704 may generate an RTK base station correction at the second point in time (ti), and the base station 704 may transmit the generated RTK base station correction data to the wireless device 702, such as described in connection with 708. At 726, the wireless device 702 may apply the received RTK base station correction data to the raw PR and the raw CP at the second point in time (ti) to estimate the biased wireless device position and the receiver clock error at the second point in time (ti), such as described in connection with 710. At 728, after applying the RTK base station correction data, the wireless device 702 may obtain a difference in CP measurements between the wireless device 702 and the base station 704 at the second point in time (ti).

At 730, the wireless device 702 may apply the biased ambiguity to a carrier phase measurement for each of the plurality of satellites, where the carrier phase measurement may be associated with the receiver clock error and an absolute location of the wireless device 702. Then, at 732, the wireless device 702 may determine a location of the wireless device (e.g., a relative location, an absolute location, etc.) based on the biased ambiguity for all of the plurality of satellites.

For example, if the loss lock does not occur, the wireless device may apply the calculated "biased ambiguity" to the carrier phase measurement afterwards, e.g., at time ti, where the carrier phase measurement after applying the "biased ambiguity" may be based on:

$$[\Delta\Phi_{b,r}(t_i) - \lambda \cdot \Delta N_{b,r}^{Biased}] = \Delta\rho_{b,r}(t_i) + \Delta dT_{b,r}(t_i) + \Delta\epsilon_{\Phi_{b,r}},$$

where $\Delta\Phi_{b,r}(t_i)$ may indicate a difference in CP measurements between the wireless device 702 and the base station 704 at the second point in time, $\Delta\rho_{b,r}(t_i)$ may indicate a difference in geometry range measurements between the wireless device 702 and the base station 704 at the second point in time, $\Delta dT_{b,r}(t_i)$ may indicate a difference in a receiver clock between the wireless device 702 and the base station 704 at the second point in time, and $\Delta\epsilon_{\Phi_{b,r}}$ may indicate a difference in measurement noise and multipath associated with the raw CP between the wireless device 702 and the base station 704 (e.g., associated with wireless device CP measurements and base station CP measurements).

For the proposed RTK mode without an initialization time, the unknown estimation states in the EKF may include wireless device position and wireless device receiver clock. The ambiguity unknown may be compensated with the "biased ambiguity," therefore it may not be an estimation state in the EKF. Then, the proposed RTK mode may enable the wireless device 702 to provide (e.g., to take the benefit of) a highly accurate carrier phase measurement and to output the estimated wireless device position at a greater accuracy without initialization time. For example, the wireless device 702 may be able to provide decimeter or even centimeter accuracy instantaneously without initialization time.

In some examples, due to the impact from the "biased ambiguity," the wireless device position (e.g., the absolute position) determined from the proposed RTK mode may have an "biased offset" to the absolute position truth. However, this "biased offset" may not change significantly over a time period (e.g., over 5 or 10 minutes, etc.). Therefore, the proposed RTK mode may provide a very accurate relative positioning accuracy from the first point in time (t0) to the second point in time (ti), which may also provide wireless devices without high-end antenna with the capabilities to perform precise outdoor distance, shape, and/or land area measurements (as the wireless devices do not wait until the ambiguity is resolved/converged). In other words, the absolute location of the wireless device 702 may be determined without converging the integer ambiguity to a stable value, where the absolute location of the wireless device 702 may be a relative position of the wireless device at a second point in time (e.g., ti) from the wireless device 702 at a first point in time (e.g., t0).

Figures 8A, 8B:
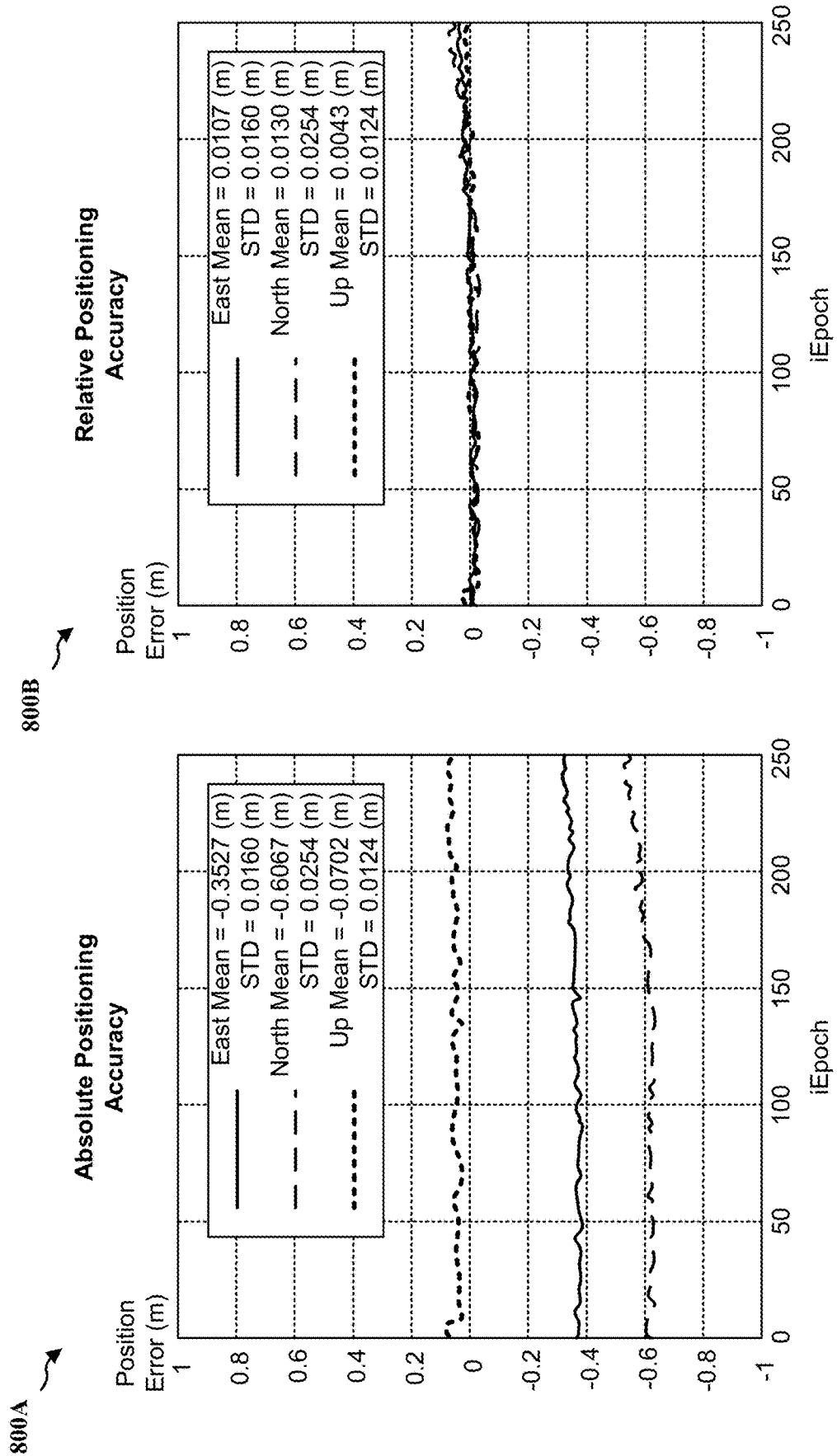
FIGS. 8A and 8B are diagrams illustrating examples of a wireless device's absolute positioning accuracy and relative positioning accuracy based on the proposed RTK mode in accordance with various aspects of the present disclosure.

FIGS. 8A and 8B are diagrams 800A and 800B illustrating examples of a wireless device's absolute positioning accuracy and relative positioning accuracy based on the proposed RTK mode in accordance with various aspects of the present disclosure. As shown by the diagram 800A, after applying the biased ambiguity based on the proposed RTK mode, there may be an "biased offset" to the absolute position of the wireless device. However, as shown by the diagram 800B, because the biased offset may not change significantly over a period of time, the proposed RTK mode may still provide a very accurate relative positioning accuracy from t0 to ti. For example, and not by way of limitation, the proposed RTK mode may enable a vehicle GPS to detect whether the vehicle has changed a lane based on the vehicle's position between t0 and t1, the proposed RTK mode may enable a cell phone user to measure a distance and/or a shape between t0 and t1, the proposed RTK mode may enable movements of a wireless device to be detected and recorded, etc., before the ambiguity is converged/resolved and/or without the ambiguity being converged/resolved.

Figure 9:
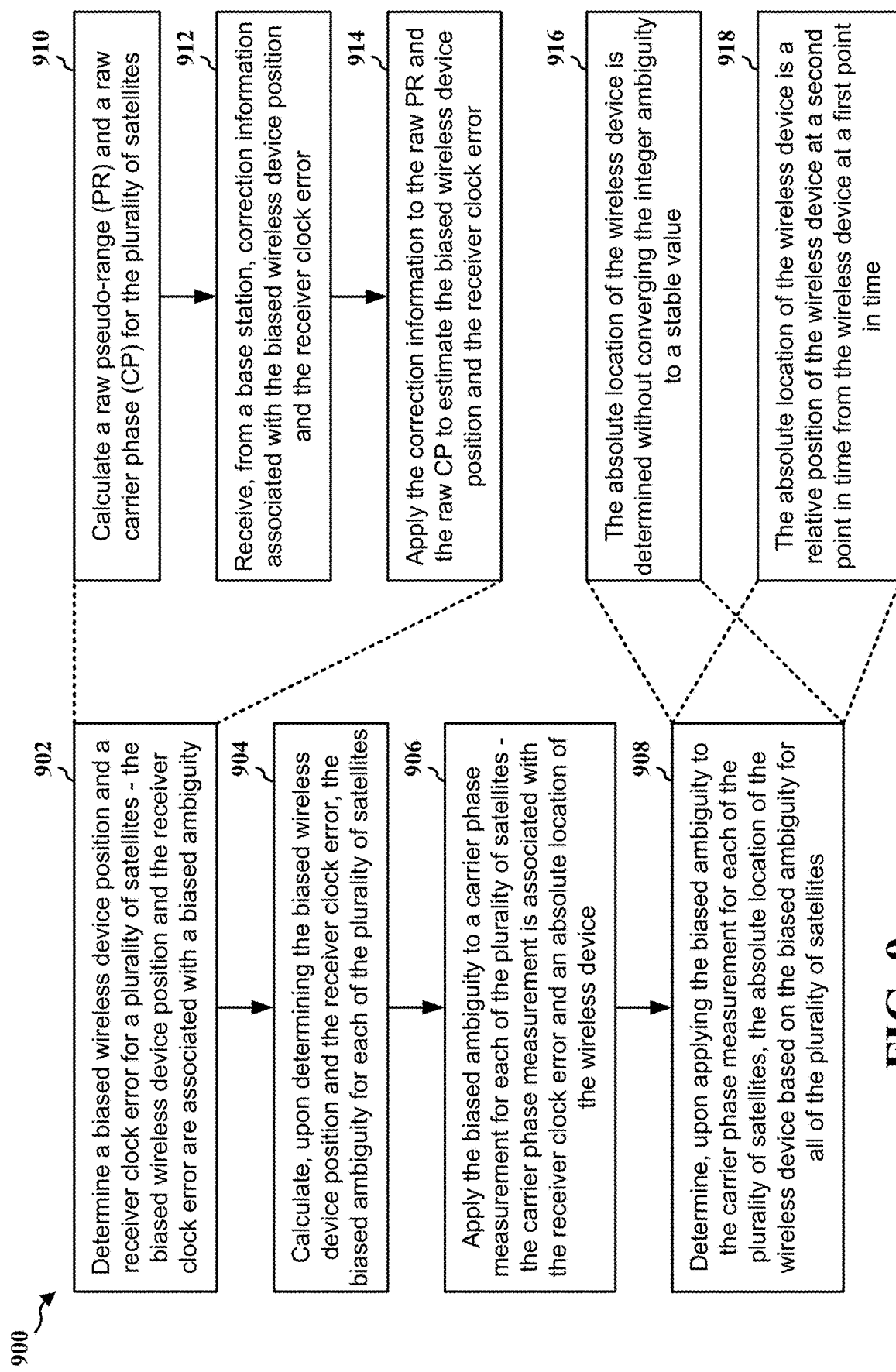
FIG. 9 is a flowchart of a method of wireless communication in accordance with aspects presented herein.

FIG. 9 is a flowchart 900 of a method of wireless communication. The method may be performed by a wireless or a component of a wireless (e.g., the UE 104, 350; the rover device 504; the wireless device 702; the apparatus 1102; a processing system, which may include the memory 360 and which may be the entire UE 350 or a component of the UE 350, such as the TX processor 368, the RX processor 356, and/or the controller/processor 359). The method may enable a wireless device (e.g., a rover device, a UE, a mobile phone, etc.) to achieve very accurate relative positioning accuracy under the RTK without or before the ambiguity for RTK is resolved/converged.

At 902, a wireless device may determine a biased wireless device position and a receiver clock error for a plurality of satellites, the biased wireless device position and the receiver clock error may be associated with a biased ambiguity, such as described in connection with FIG. 7. For example, at 718, the wireless device 702 may determine a biased wireless device position and a receiver clock error for a plurality of satellites, where the biased wireless device position and the receiver clock error may be associated with a biased ambiguity. The determination of the biased wireless device position and the receiver clock error may be performed by, e.g., the biased position and clock determination component 1140 of the apparatus 1102 in FIG. 11.

In one example, as shown at 910, 912, and 914, in determining the biased wireless device position and the receiver clock error for the plurality of satellites, the wireless device may calculate a raw PR and a raw CP for the plurality of satellites. Then, the wireless device may receive, from a base station, correction information associated with the biased wireless device position and the receiver clock error. Then, the wireless device may apply the correction information to the raw PR and the raw CP to estimate the biased wireless device position and the receiver clock error, such as described in connection with 706, 708, and 710 of FIG. 7.

In such an example, the raw PR may be calculated based on: $P_r = \rho_r + dT_r - dt + dTrop_r + dIono_r + \epsilon_{P_r}$, where $P_r$ may indicate a PR measurement between the wireless device and the plurality of satellites, $\rho_r$ may indicate a geometry range between the wireless device and the plurality of satellites, $dT_r$ may indicate a receiver clock, dt may indicate a satellite clock error, $dTrop_r$ may indicate ax tropospheric error, $dIono_r$ may indicate an ionospheric error, and $\epsilon_{P_r}$ may indicate a measurement noise and multipath associated with the PR measurement.

In such an example, the raw CP may be calculated based on: $\Phi_r = \rho_r + dT_r - dt + dTrop_r - dIono_r + \lambda \cdot N_r + \epsilon_{\Phi_r}$, where $\Phi_r$ may indicate a CP measurement between the wireless device and the plurality of satellites, $\rho_r$ may indicate a geometry range between the wireless device and the plurality of satellites, $dT_r$ may indicate a receiver clock, dt may indicate a satellite clock error, $dTrop_r$ may indicate a tropospheric error, $dIono_r$ may indicate an ionospheric error, $\lambda$ may indicate a wavelength, $N_r$ may indicate an integer ambiguity, and c may indicate a measurement noise and multipath associated with the CP measurement.

In such an example, the raw PR after applying the correction information at the first point in time ($t_0$) may be based on: $\Delta P_{b,r}(t_0) = \Delta\rho_{b,r}(t_0) + \Delta dT_{b,r}(t_0) + \Delta\epsilon_{P_{b,r}}$, where $\Delta P_{b,r}$ may indicate a difference in PR measurements between the wireless device and the base station at the first point in time, $\Delta\rho_{b,r}(t_0)$ may indicate a difference in geometry range measurements between the wireless device and the base station at the first point in time, $\Delta dT_{b,r}(t_0)$ may indicate a difference in a receiver clock between the wireless device and the base station at the first point in time, and $\Delta \epsilon_{P_{b,r}}$ may indicate a difference in measurement noise and multipath associated with wireless device PR measurements and base station PR measurements.

In such an example, the raw CP after applying the correction information at the first point in time may be based on: $\Delta\Phi_{b,r}(t_0)=\Delta\rho_{b,r}(t_0)+\Delta dT_{b,r}(t_0)+\lambda \cdot \Delta N_{b,r}+\Delta\epsilon_{\Phi_{b,r}}$, where $\Delta\Phi_{b,r}(t_0)$ may indicate a difference in CP measurements between the wireless device and the base station at the first point in time, $\Delta\rho_{b,r}(t_0)$ may indicate a difference in geometry range measurements between the wireless device and the base station at the first point in time, $\Delta dT_{b,r}(t_0)$ may indicate a difference in a receiver clock between the wireless device and the base station at the first point in time, $\Delta N_{b,r}$ may indicate a difference in an integer ambiguity between the wireless device and the base station, and $\Delta\epsilon_{\Phi_{b,r}}$ may indicate a difference in measurement noise and multipath associated with wireless device CP measurements and base station CP measurements.

In such an example, the biased ambiguity at the first point in time may be calculated based on: $\lambda \cdot \Delta N_{b,r}=\Delta\Phi_{b,r}(t_0)-[\Delta\rho_{b,r}(t_0)+\Delta dT_{b,r}(t_0)]$.

In such an example, the carrier phase measurement at the second point in time $(t_i)$ for each of the plurality of satellites after applying the biased ambiguity may be based on: $[\Delta\Phi_{b,r}(t_i)-\lambda \cdot \Delta N_{b,r}]=\Delta\rho_{b,r}(t_i)+\Delta dT_{b,r}(t_i)+\Delta\epsilon_{\Phi_{b,r}}$, where $\Delta\Phi_{b,r}(t_i)$ may indicate a difference in CP measurements between the wireless device and the base station at the second point in time, $\Delta\rho_{b,r}(t_i)$ may indicate a difference in geometry range measurements between the wireless device and the base station at the second point in time, $\Delta dT_{b,r}(t_i)$ may indicate a difference in a receiver clock between the wireless device and the base station at the second point in time, and $\Delta\epsilon_{\Phi_{b,r}}$ may indicate a difference in noise and multipath measurements associated with wireless device CP measurements and base station CP measurements.

At 904, the wireless device may calculate, upon determining the biased wireless device position and the receiver clock error, the biased ambiguity for each of the plurality of satellites, such as described in connection with FIG. 7. For example, at 720, the wireless device 702 may calculate the biased ambiguity for each of the plurality of satellites. The calculation of the biased ambiguity may be performed by, e.g., the biased ambiguity calculation component 1142 of the apparatus 1102 in FIG. 11.

At 906, the wireless device may apply the biased ambiguity to a carrier phase measurement for each of the plurality of satellites, the carrier phase measurement may be associated with the receiver clock error and an absolute location of the wireless device, such as described in connection with FIG. 7. For example, at 721 and 730, the wireless device 702 may apply the biased ambiguity to a carrier phase measurement for each of the plurality of satellites, where the carrier phase measurement may be associated with the receiver clock error and an absolute location of the wireless device. The application of the biased ambiguity may be performed by, e.g., the biased ambiguity application component 1144 of the apparatus 1102 in FIG. 11.

At 908, the wireless device may determine, upon applying the biased ambiguity to the carrier phase measurement for each of the plurality of satellites, the absolute location of the wireless device based on the biased ambiguity for all of the plurality of satellites, such as described in connection with FIG. 7. For example, at 732, the wireless device 702 may determine the absolute location of the wireless device based on the biased ambiguity for all of the plurality of satellites. The determination of the absolute location may be performed by, e.g., the location determination component 1146 of the apparatus 1102 in FIG. 11. Thus, the absolute location of the wireless device may be associated with the carrier phase measurement and a pseudo-range measurement.

In one example, as shown at 916, the absolute location of the wireless device may be determined without converging the integer ambiguity to a stable value.

In another example, as shown at 918, the absolute location of the wireless device may be a relative position of the wireless device at a second point $(t_i)$ in time from the wireless device at a first point in time $(t_0)$.

Figure 10:
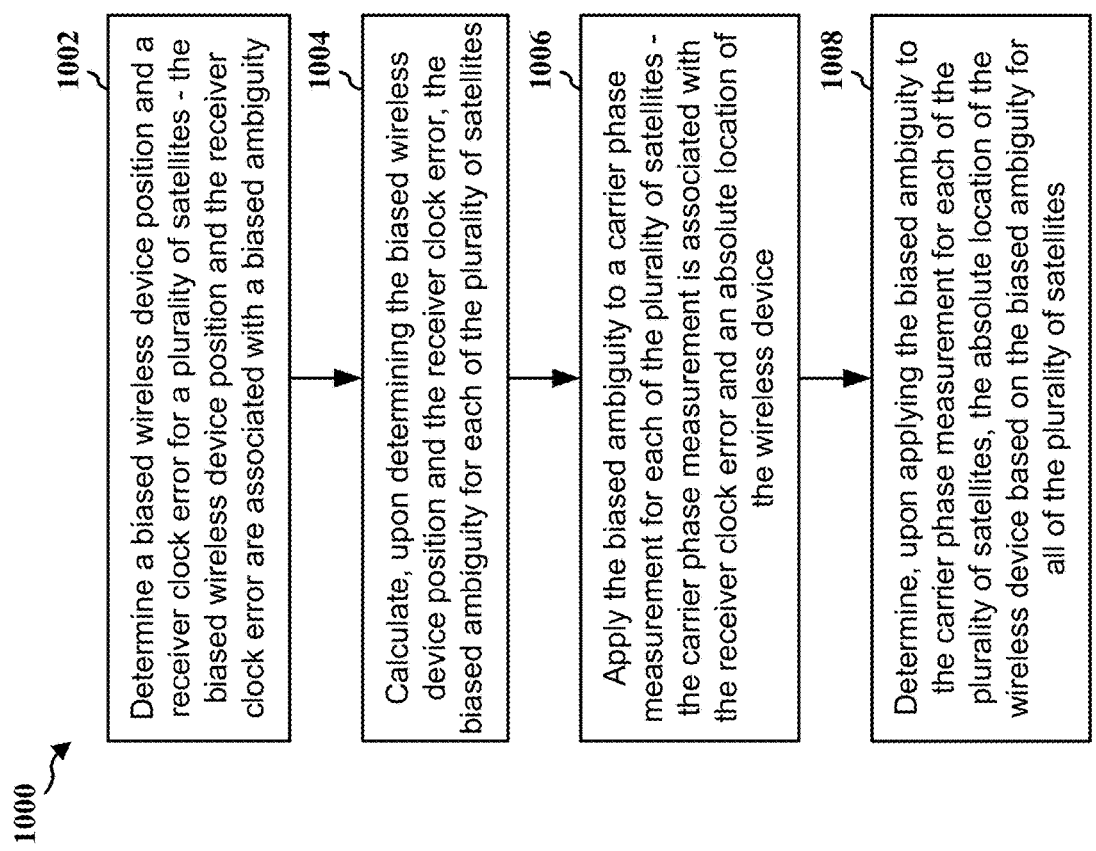
FIG. 10 is a flowchart of a method of wireless communication in accordance with aspects presented herein.

FIG. 10 is a flowchart 1000 of a method of wireless communication. The method may be performed by a wireless or a component of a wireless (e.g., the UE 104, 350; the rover device 504; the wireless device 702; the apparatus 1102; a processing system, which may include the memory 360 and which may be the entire UE 350 or a component of the UE 350, such as the TX processor 368, the RX processor 356, and/or the controller/processor 359). The method may enable a wireless device (e.g., a rover device, a UE, a mobile phone, etc.) to achieve very accurate relative positioning accuracy under the RTK without or before the ambiguity for RTK is resolved/converged.

At 1002, a wireless device may determine a biased wireless device position and a receiver clock error for a plurality of satellites, the biased wireless device position and the receiver clock error may be associated with a biased ambiguity, such as described in connection with FIG. 7. For example, at 718, the wireless device 702 may determine a biased wireless device position and a receiver clock error for a plurality of satellites, where the biased wireless device position and the receiver clock error may be associated with a biased ambiguity. The determination of the biased wireless device position and the receiver clock error may be performed by, e.g., the biased position and clock determination component 1140 of the apparatus 1102 in FIG. 11.

In one example, in determining the biased wireless device position and the receiver clock error for the plurality of satellites, the wireless device may calculate a raw PR and a raw CP for the plurality of satellites. Then, the wireless device may receive, from a base station, correction information associated with the biased wireless device position and the receiver clock error. Then, the wireless device may apply the correction information to the raw PR and the raw CP to estimate the biased wireless device position and the receiver clock error, such as described in connection with 706, 708, and 710 of FIG. 7.

In such an example, the raw PR may be calculated based on: $P_r=\rho_r+dT_r-dt+dTrop_r+dIono_r+\epsilon_{P_r}$, where $P_r$ may indicate a PR measurement between the wireless device and the plurality of satellites, $\rho_r$ may indicate a geometry range between the wireless device and the plurality of satellites, $dT_r$ may indicate a receiver clock, $dt$ may indicate a satellite clock error, $dTrop_r$ may indicate a tropospheric error, $dIono_r$ may indicate an ionospheric error, and $\epsilon_{P_r}$ may indicate a measurement noise and multipath associated with the PR measurement.

In such an example, the raw CP may be calculated based on: $\Phi_r=\rho_r+dT_r-dt+dTrop_r-dIono_r+\lambda \cdot N_r+\epsilon_{\Phi_r}$, where $\Phi_r$ may indicate a CP measurement between the wireless device and the plurality of satellites, $\rho_r$ may indicate a geometry range between the wireless device and the plurality of satellites, $dT_r$ may indicate a receiver clock, $dt$ may indicate a satellite clock error, $dTrop_r$ may indicate a tropospheric error, $dIono_r$ may indicate an ionospheric error, $\lambda$ may indicate a wavelength, $N_r$ may indicate an integer ambiguity, and $\epsilon_{\Phi_r}$ may indicate a measurement noise and multipath associated with the CP measurement.

In such an example, the raw PR after applying the correction information at the first point in time ($t_0$) may be based on: $\Delta P_{b,r}(t_0) = \Delta \rho_{b,r}(t_0) + \Delta dT_{b,r}(t_0) + \Delta \epsilon_{P_{b,r}}$, where $\Delta P_{b,r}$ may indicate a difference in PR measurements between the wireless device and the base station at the first point in time, $\Delta \rho_{b,r}(t_0)$ may indicate a difference in geometry range measurements between the wireless device and the base station at the first point in time, $\Delta dT_{b,r}(t_0)$ may indicate a difference in a receiver clock between the wireless device and the base station at the first point in time, and $\Delta \epsilon_{P_{b,r}}$ may indicate a difference in measurement noise and multipath associated with wireless device PR measurements and base station PR measurements.

In such an example, the raw CP after applying the correction information at the first point in time may be based on: $\Delta \Phi_{b,r}(t_0) = \Delta \rho_{b,r}(t_0) + \Delta dT_{b,r}(t_0) + \lambda \cdot \Delta N_{b,r} + \Delta \epsilon_{\Phi_{b,r}}$, where $\Delta \Phi_{b,r}(t_0)$ may indicate a difference in CP measurements between the wireless device and the base station at the first point in time, $\Delta \rho_{b,r}(t_0)$ may indicate a difference in geometry range measurements between the wireless device and the base station at the first point in time, $\Delta dT_{b,r}(t_0)$ may indicate a difference in a receiver clock between the wireless device and the base station at the first point in time, $\Delta N_{b,r}$ may indicate a difference in an integer ambiguity between the wireless device and the base station, and $\Delta \epsilon_{\Phi_{b,r}}$ may indicate a difference in measurement noise and multipath associated with wireless device CP measurements and base station CP measurements.

In such an example, the biased ambiguity at the first point in time may be calculated based on: $\lambda \cdot \Delta N_{b,r} - \Delta \Phi_{b,r}(t_0) - [\Delta P_{b,r}(t_0) + \Delta dT_{b,r}(t_0)]$.

In such an example, the carrier phase measurement at the second point in time ($t_i$) for each of the plurality of satellites after applying the biased ambiguity may be based on: $[\Delta \Phi_{b,r}(t_i) - \lambda \cdot \Delta N_{b,r}] = \Delta \rho_{b,r}(t_i) + \Delta \epsilon_{\Phi_{b,r}}$, where $\Delta \Phi_{b,r}(t_i)$ may indicate a difference in CP measurements between the wireless device and the base station at the second point in time, $\Delta \rho_{b,r}(t_i)$ may indicate a difference in geometry range measurements between the wireless device and the base station at the second point in time, $\Delta dT_{b,r}(t_i)$ may indicate a difference in a receiver clock between the wireless device and the base station at the second point in time, and $\Delta \epsilon_{\Phi_{b,r}}$ may indicate a difference in noise and multipath measurements associated with wireless device CP measurements and base station CP measurements.

At 1004, the wireless device may calculate, upon determining the biased wireless device position and the receiver clock error, the biased ambiguity for each of the plurality of satellites, such as described in connection with FIG. 7. For example, at 720, the wireless device 702 may calculate the biased ambiguity for each of the plurality of satellites. The calculation of the biased ambiguity may be performed by, e.g., the biased ambiguity calculation component 1142 of the apparatus 1102 in FIG. 11.

At 1006, the wireless device may apply the biased ambiguity to a carrier phase measurement for each of the plurality of satellites, the carrier phase measurement may be associated with the receiver clock error and an absolute location of the wireless device, such as described in connection with FIG. 7. For example, at 721 and 730, the wireless device 702 may apply the biased ambiguity to a carrier phase measurement for each of the plurality of satellites, where the carrier phase measurement may be associated with the receiver clock error and an absolute location of the wireless device.

Figure 11:
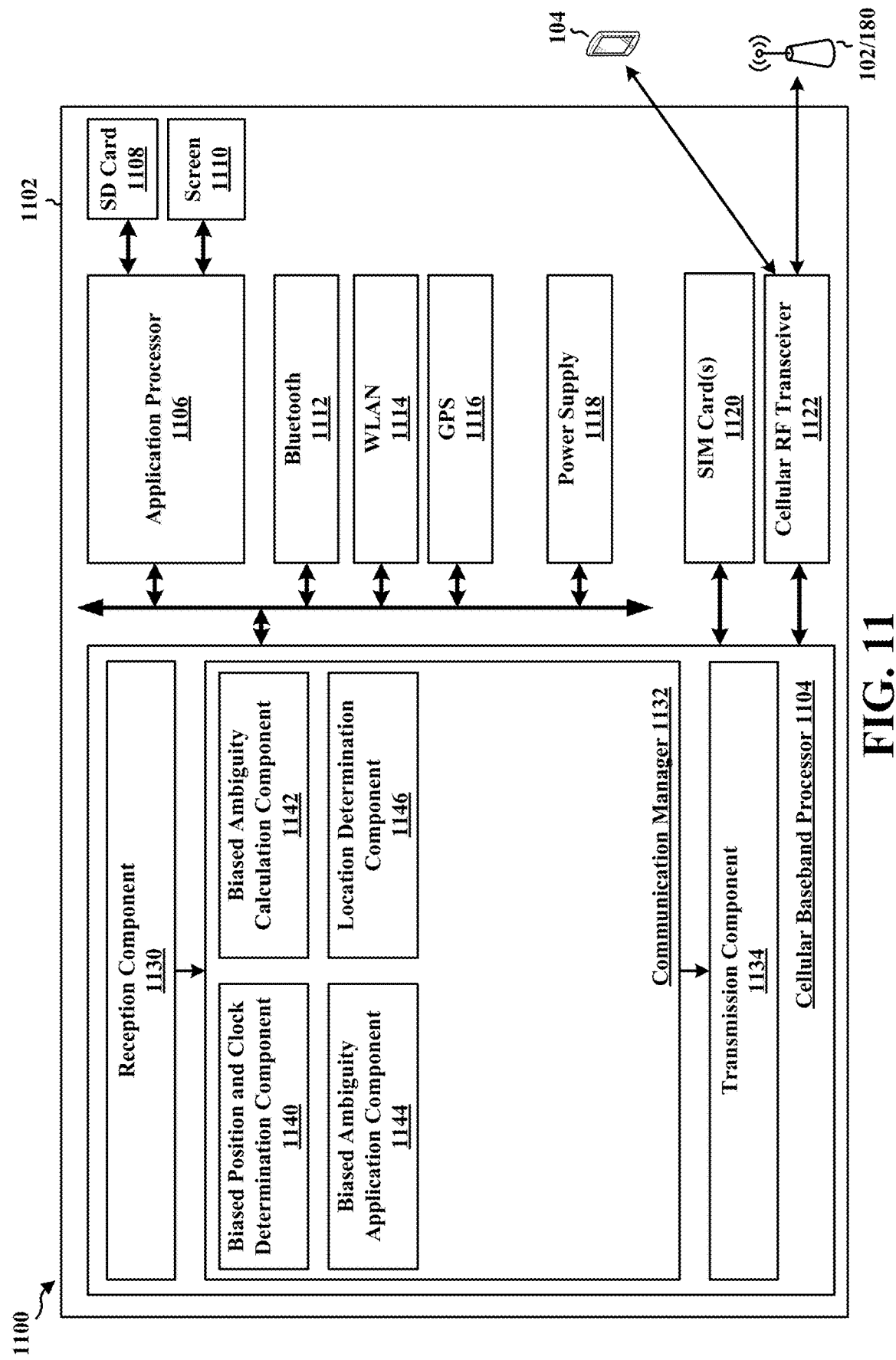
FIG. 11 is a diagram illustrating an example of a hardware implementation for an example apparatus in accordance with aspects presented herein.

The application of the biased ambiguity may be performed by, e.g., the biased ambiguity application component 1144 of the apparatus 1102 in FIG. 11.

At 1008, the wireless device may determine, upon applying the biased ambiguity to the carrier phase measurement for each of the plurality of satellites, the absolute location of the wireless device based on the biased ambiguity for all of the plurality of satellites, such as described in connection with FIG. 7. For example, at 732, the wireless device 702 may determine the absolute location of the wireless device based on the biased ambiguity for all of the plurality of satellites. The determination of the absolute location may be performed by, e.g., the location determination component 1146 of the apparatus 1102 in FIG. 11. Thus, the absolute location of the wireless device may be associated with the carrier phase measurement and a pseudo-range measurement.

In one example, the absolute location of the wireless device may be determined without converging the integer ambiguity to a stable value.

In another example, the absolute location of the wireless device may be a relative position of the wireless device at a second point ($t_i$) in time from the wireless device at a first point in time ($t_0$).

FIG. 11 is a diagram 1100 illustrating an example of a hardware implementation for an apparatus 1102. The apparatus 1102 may be a UE, a component of a UE, or may implement UE functionality. In some aspects, the apparatus 1102 may include a cellular baseband processor 1104 (also referred to as a modem) coupled to a cellular RF transceiver 1122. In some aspects, the apparatus 1102 may further include one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, or a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the additional modules of the apparatus 1102.

The communication manager 1132 includes a biased position and clock determination component 1140 that is configured to determine a biased wireless device position and a receiver clock error for a plurality of satellites, the biased wireless device position and the receiver clock error may be associated with a biased ambiguity, e.g., as described in connection with 902 of FIG. 9 and/or 1002 of FIG. 10. The communication manager 1132 further includes a biased ambiguity calculation component 1142 that is configured to calculate, upon determining the biased wireless device position and the receiver clock error, the biased ambiguity for each of the plurality of satellites, e.g., as described in connection with 904 of FIG. 9 and/or 1004 of FIG. 10. The communication manager 1132 further includes a biased ambiguity application component 1144 that is configured to apply the biased ambiguity to a carrier phase measurement for each of the plurality of satellites, the carrier phase measurement may be associated with the receiver clock error and an absolute location of the wireless device, e.g., as described in connection with 906 of FIG. 9 and/or 1006 of FIG. 10. The communication manager 1132 further includes a location determination component 1146 that is configured to determine, upon applying the biased ambiguity to the carrier phase measurement for each of the plurality of satellites, the absolute location of the wireless device based on the biased ambiguity for all of the plurality of satellites, e.g., as described in connection with 908 of FIG. 9 and/or 1008 of FIG. 10.

The apparatus may include additional components that perform each of the blocks of the algorithm in the flowcharts of FIGS. 9 and 10. As such, each block in the flowcharts of FIGS. 9 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the cellular baseband processor 1104, includes means for determining a biased wireless device position and a receiver clock error for a plurality of satellites, the biased wireless device position and the receiver clock error may be associated with a biased ambiguity (e.g., the biased position and clock determination component 114). The apparatus 1102 includes means for calculating, upon determining the biased wireless device position and the receiver clock error, the biased ambiguity for each of the plurality of satellites (e.g., the biased ambiguity calculation component 1142). The apparatus 1102 includes means for applying the biased ambiguity to a carrier phase measurement for each of the plurality of satellites, the carrier phase measurement may be associated with the receiver clock error and an absolute location of the wireless device (e.g., the biased ambiguity application component 1144). The apparatus 1102 includes means for determining, upon applying the biased ambiguity to the carrier phase measurement for each of the plurality of satellites, the absolute location of the wireless device based on the biased ambiguity for all of the plurality of satellites (e.g., the location determination component 1146).

In one configuration, in determining the biased wireless device position and the receiver clock error for the plurality of satellites, the wireless device may calculate a raw PR and a raw CP for the plurality of satellites. Then, the wireless device may receive, from a base station, correction information associated with the biased wireless device position and the receiver clock error. Then, the wireless device may apply the correction information to the raw PR and the raw CP to estimate the biased wireless device position and the receiver clock error, such as described in connection with 706, 708, and 710 of FIG. 7.

In such a configuration, the raw PR may be calculated based on: $P_r = \rho_r + dT_r - dt + dTrop_r + dIono_r + \epsilon_{P_r}$, where $P_r$ may indicate a PR measurement between the wireless device and the plurality of satellites, $\rho_r$ may indicate a geometry range between the wireless device and the plurality of satellites, $dT_r$ may indicate a receiver clock, $dt$ may indicate a satellite clock error, $dTrop_r$ may indicate a tropospheric error, $dIono_r$ may indicate an ionospheric error, and $\epsilon_{P_r}$ may indicate a measurement noise and multipath associated with the PR measurement.

In such a configuration, the raw CP may be calculated based on: $\Phi_r = \rho_r + dT_r - dt + dTrop_r - dIono_r + \lambda \cdot N_r + \epsilon_{\Phi_r}$, where $\Phi_r$ may indicate a CP measurement between the wireless device and the plurality of satellites, $\rho_r$ may indicate a geometry range between the wireless device and the plurality of satellites, $dT_r$ may indicate a receiver clock, $dt$ may indicate a satellite clock error, $dTrop_r$ may indicate a tropospheric error, $dIono_r$ may indicate an ionospheric error, $\lambda$ may indicate a wavelength, $N_r$ may indicate an integer ambiguity, and $\epsilon_{\Phi_r}$ may indicate a measurement noise and multipath associated with the CP measurement.

In such a configuration, the raw PR after applying the correction information at the first point in time ($t_0$) may be based on: $\Delta P_{b,r}(t_0) = \Delta \rho_{b,r}(t_0) + \Delta dT_{b,r}(t_0) + \Delta \epsilon_{b,r}$, where $\Delta P_{b,r}$ may indicate a difference in PR measurements between the wireless device and the base station at the first point in time, $\Delta \rho_{b,r}(t_0)$ may indicate a difference in geometry range measurements between the wireless device and the base station at the first point in time, $\Delta dT_{b,r}(t_0)$ may indicate a difference in a receiver clock between the wireless device and the base station at the first point in time, and $\Delta \epsilon_{P_{b,r}}$ at may indicate a difference in measurement noise and multipath associated with wireless device PR measurements and base station PR measurements.

In such a configuration, the raw CP after applying the correction information at the first point in time may be based on: $\Delta \Phi_{b,r}(t_0) = \Delta P_{b,r}(t_0) + \Delta dT_{b,r}(t_0) + \lambda \cdot \Delta N_{b,r} + \Delta \epsilon_{\Phi_{b,r}}$, where $\Delta \Phi_{b,r}(t_0)$ may indicate a difference in CP measurements between the wireless device and the base station at the first point in time, $\Delta \rho_{b,r}(t_0)$ may indicate a difference in geometry range measurements between the wireless device and the base station at the first point in time, $\Delta dT_{b,r}(t_0)$ may indicate a difference in a receiver clock between the wireless device and the base station at the first point in time, $\Delta N_{b,r}$ may indicate a difference in an integer ambiguity between the wireless device and the base station, and $\Delta \epsilon_{\Phi_{b,r}}$ at may indicate a difference in measurement noise and multipath associated with wireless device CP measurements and base station CP measurements.

In such a configuration, the biased ambiguity at the first point in time may be calculated based on: $\lambda \cdot \Delta N_{b,r} = \Delta \Phi_{b,r}(t_0) - [\Delta \rho_{b,r}(t_0) + \Delta dT_{b,r}(t_0)]$.

In such a configuration, the carrier phase measurement at the second point in time ($t_i$) for each of the plurality of satellites after applying the biased ambiguity may be based on: $[\Delta \Phi_{b,r}(t_i) - \lambda \cdot \Delta N_{b,r}] = \Delta \rho_{b,r}(t_i) + \Delta dT_{b,r}(t_i) + \Delta \epsilon_{\Phi_{b,r}}$, where $\Delta \Phi_{b,r}(t_i)$ may indicate a difference in CP measurements between the wireless device and the base station at the second point in time, $\Delta \rho_{b,r}(t_i)$ may indicate a difference in geometry range measurements between the wireless device and the base station at the second point in time, $\Delta dT_{b,r}(t_i)$ may indicate a difference in a receiver clock between the wireless device and the base station at the second point in time, and $\Delta \epsilon_{\Phi_{b,r}}$ at may indicate a difference in noise and multipath measurements associated with wireless device CP measurements and base station CP measurements.

In another configuration, the absolute location of the wireless device may be determined without converging the integer ambiguity to a stable value.

In another configuration, the absolute location of the wireless device may be a relative position of the wireless device at a second point ($t_i$) in time from the wireless device at a first point in time ($t_0$).

The means may be one or more of the components of the apparatus 1102 configured to perform the functions recited by the means. As described supra, the apparatus 1102 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and configured to determine a biased wireless device position and a receiver clock error for a plurality of satellites, the biased wireless device position and the receiver clock error being associated with a biased ambiguity; calculate, upon determining the biased wireless device position and the receiver clock error, the biased ambiguity for each of the plurality of satellites; apply the biased ambiguity to a carrier phase measurement for each of the plurality of satellites, the carrier phase measurement being associated with the receiver clock error and an absolute location of the wireless device; and determine, upon applying the biased ambiguity to the carrier phase measurement for each of the plurality of satellites, the absolute location of the wireless device based on the biased ambiguity for all of the plurality of satellites.

Aspect 2 is the apparatus of aspect 1, further including a transceiver coupled to the at least one processor.

Aspect 3 is the apparatus of any of aspects 1 and 2, where the processor is further configured to: calculate a raw PR and a raw CP for the plurality of satellites; receive, from a base station, correction information associated with the biased wireless device position and the receiver clock error; and apply the correction information to the raw PR and the raw CP to estimate the biased wireless device position and the receiver clock error.

Aspect 4 is the apparatus of any of aspects 1 to 3, where the raw PR is calculated based on: $P_r = \rho_r + dT_r - dt + dTrop_r + dIono_r + \epsilon_{P_r}$, where: $P_r$ is a PR measurement between the wireless device and the plurality of satellites, $\rho_r$ is a geometry range between the wireless device and the plurality of satellites, $dT_r$ is a receiver clock, $dt$ is a satellite clock error, $dTrop_r$ is a tropospheric error, $dIono_r$ is an ionospheric error, and $\epsilon_{P_r}$ is a measurement noise and multipath associated with the PR measurement.

Aspect 5 is the apparatus of any of aspects 1 to 4, where the raw CP is calculated based on: $\Phi_r = \rho_r + dT_r - dt + dTrop_r - dIono_r + \lambda \cdot N_r + \epsilon_{\Phi_r}$, where: $\Phi_r$ is a CP measurement between the wireless device and the plurality of satellites, $\rho_r$ is a geometry range between the wireless device and the plurality of satellites, $dT_r$ is a receiver clock, $dt$ is a satellite clock error, $dTrop_r$ is a tropospheric error, $dIono_r$ is an ionospheric error, $\lambda$ is a wavelength, $N_r$ is an integer ambiguity, and $\epsilon_{\Phi_r}$ is a measurement noise and multipath associated with the CP measurement.

Aspect 6 is the apparatus of any of aspects 1 to 5, where the absolute location of the wireless device is determined without converging the integer ambiguity to a stable value.

Aspect 7 is the apparatus of any of aspects 1 to 6, where the absolute location of the wireless device is a relative position of the wireless device at a second point ($t_i$) in time from the wireless device at a first point in time ($t_0$).

Aspect 8 is the apparatus of any of aspects 1 to 7, where the raw PR after applying the correction information at the first point in time ($t_0$) is: $\Delta P_{b,r}(t_0) \Delta \rho_{b,r}(t_0) + \Delta dT_{b,r}(t_0) + \Delta \epsilon_{P_{b,r}}$, where: $\Delta P_{b,r}$ is a difference in PR measurements between the wireless device and the base station at the first point in time, $\Delta\rho_{b,r}(t_0)$ is a difference in geometry range measurements between the wireless device and the base station at the first point in time, $\Delta dT_{b,r}(t_0)$ is a difference in a receiver clock between the wireless device and the base station at the first point in time, and $\Delta\epsilon_{P_{b,r}}$ is a difference in measurement noise and multipath associated with wireless device PR measurements and base station PR measurements.

Aspect 9 is the apparatus of any of aspects 1 to 8, where the raw CP after applying the correction information at the first point in time is: $\Delta\Phi_{b,r}(t_0)\Delta\rho_{b,r}(t_0)+\Delta dT_{b,r}(t_0)+\lambda\cdot\Delta N_{b,r}+\Delta\epsilon_{\Phi_{b,r}}$, where: $\Delta\Phi_{b,r}(t_0)$ is a difference in CP measurements between the wireless device and the base station at the first point in time, $\Delta\rho_{b,r}(t_0)$ is the difference in geometry range measurements between the wireless device and the base station at the first point in time, $\Delta dT_{b,r}(t_0)$ is the difference in a receiver clock between the wireless device and the base station at the first point in time, $\Delta N_{b,r}$ is a difference in an integer ambiguity between the wireless device and the base station, and $\Delta\epsilon_{\Phi_{b,r}}$ is a difference in measurement noise and multipath associated with wireless device CP measurements and base station CP measurements.

Aspect 10 is the apparatus of any of aspects 1 to 9, where the biased ambiguity at the first point in time is calculated based on: $\lambda\cdot\Delta N_{b,r}=\Delta\Phi_{b,r}(t_0)-[\Delta\rho_{b,r}(t_0)+\Delta dT_{b,r}(t_0)]$.

Aspect 11 is the apparatus of any of aspects 1 to 10, where the carrier phase measurement at the second point in time $(t_i)$ for each of the plurality of satellites after applying the biased ambiguity is: $[\Delta\Phi_{b,r}(t_i)-\lambda\cdot\Delta N_{b,r}]=\Delta\rho_{b,r}(t_i)+\Delta dT_{b,r}(t_i)+\Delta\epsilon_{\Phi_{b,r}}$, where: $\Delta\Phi_{b,r}(t_i)$ is a difference in CP measurements between the wireless device and the base station at the second point in time, $\Delta\rho_{b,r}(t_i)$ is a difference in geometry range measurements between the wireless device and the base station at the second point in time, $\Delta dT_{b,r}(t_i)$ is a difference in a receiver clock between the wireless device and the base station at the second point in time, and $\Delta\epsilon_{\Phi_{b,r}}$ is the difference in measurement noise and multipath associated with wireless device CP measurements and base station CP measurements.

Aspect 12 is the apparatus of any of aspects 1 to 11, where the wireless device is a UE or a rover device.

Aspect 13 is the apparatus of any of aspects 1 to 12, where the absolute location of the wireless device is associated with the carrier phase measurement and a pseudo-range measurement.

Aspect 14 is a method of wireless communication for implementing any of aspects 1 to 13.

Aspect 15 is an apparatus for wireless communication including means for implementing any of aspects 1 to 13.

Aspect 16 is a computer-readable medium storing computer executable code, where the code when executed by a processor causes the processor to implement any of aspects 1 to 13.

What is claimed is:

1. An apparatus for wireless communication at a wireless device, comprising:
   memory;
   a global navigation satellite systems (GNSS) or global positioning system (GPS) (GNSS/GPS) receiver;
   a transceiver; and
   at least one processor, communicatively connected to the memory and the transceiver, the at least one processor, individually or in any combination, is configured to:
   receive, via the GNSS/GPS receiver, a first set of signals from a plurality of satellites at a first point in time;
   calculate a raw pseudo-range (PR) and a raw carrier phase (CP) for each of the plurality of satellites based on the reception of the set of signals at the first point in time;
   receive, from a base station via the transceiver, correction information associated with the plurality of satellites;
   apply the correction information to the raw PR and the raw CP to estimate a biased wireless device position and a GNSS/GPS receiver clock error for the plurality of satellites;
   calculate a biased ambiguity based on the biased wireless device position, the GNSS/GPS receiver clock error, and a difference in CP measurements between the wireless device and the base station for each of the plurality of satellites;
   apply the calculated biased ambiguity to a carrier phase measurement associated with a second set of signals received from each of the plurality of satellites at a second point in time; and
   determine, upon applying the calculated biased ambiguity to the carrier phase measurement for each of the plurality of satellites, a relative location of the wireless device at the second point in time based on the biased ambiguity for all of the plurality of satellites.

2. The apparatus of claim 1, wherein the correction information includes correction data for at least one of a satellite orbit, a satellite clock, or an atmospheric error.

3. The apparatus of claim 1, wherein to calculate the raw PR, the at least one processor, individually or in any combination, is configured to calculate the raw PR based on:

$$P_r=\rho_r+dT_r-dt+d\text{Trop}_r+d\text{Iono}_r+\epsilon_{P_r},$$

wherein: $P_r$ is a PR measurement between the wireless device and the plurality of satellites, $\rho_r$ is a geometry range between the wireless device and the plurality of satellites, $dT_r$ is the GNSS/GPS receiver clock error, $dt$ is a satellite clock error, $d\text{Trop}_r$ is a tropospheric error, $d\text{Iono}_r$ is an ionospheric error, and $\epsilon_{P_r}$ is a measurement noise and multipath associated with the PR measurement.

4. The apparatus of claim 3, wherein to calculate the raw CP, the at least one processor, individually or in any combination, is configured to calculate the raw CP based on:

$$\Phi_r=\rho_r+dT_r-dt+d\text{Trop}_r-d\text{Iono}_r+\lambda\cdot N_r+\epsilon_{\Phi_r},$$

wherein: $\Phi_r$ is a CP measurement between the wireless device and the plurality of satellites, $\rho_r$ is the geometry range between the wireless device and the plurality of satellites, $dT_r$ is the GNSS/GPS receiver clock error, $dt$ is the satellite clock error, $d\text{Trop}_r$ is the tropospheric error, $d\text{Iono}_r$ is the ionospheric error, $\lambda$ is a wavelength, $N_r$ is an integer ambiguity, and $\epsilon_{\Phi_r}$ is a measurement noise and multipath associated with the CP measurement.

5. The apparatus of claim 4, wherein to determine the relative location of the wireless device, the at least one processor, individually or in any combination, is configured to determine the relative location of the wireless device before the integer ambiguity is converged.

6. The apparatus of claim 3, wherein a difference in PR measurements between the wireless device and the base station at the first point in time $(t_0)$ is calculated based on:

$$\Delta P_{b,r}(t_0)=\Delta\rho_{b,r}(t_0)+\Delta dT_{b,r}(t_0)+\Delta\epsilon_{P_{b,r}},$$

wherein: $(t_0)$ is the first point in time, $\Delta P_{b,r}$ is the difference in PR measurements between the wireless device and the base station at the first point in time, $\Delta\rho_{b,r}(t_0)$ is a difference in geometry range measurements between the wireless device and the base station at the first point in time, $\Delta dT_{b,r}(t_0)$ is a difference in the GNSS/GPS receiver clock error between the wireless device and the base station at the first point in time, and $\Delta \epsilon_{P_{b,r}}$ is a difference in the measurement noise and multipath associated with wireless device PR measurements and base station PR measurements.

7. The apparatus of claim 6, wherein the difference in CP measurements between the wireless device and the base station at the first point in time is calculated based on:

$$\Delta \Phi_{b,r}(t_0) = \Delta \rho_{b,r}(t_0) + \Delta dT_{b,r}(t_0) + \lambda \cdot \Delta N_{b,r} + \Delta \epsilon_{\Phi_{b,r}},$$

wherein: $\Delta \Phi_{b,r}(t_0)$ is the difference in CP measurements between the wireless device and the base station at the first point in time, $\Delta \rho_{b,r}(t_0)$ is the difference in geometry range measurements between the wireless device and the base station at the first point in time, $\Delta dT_{b,r}(t_0)$ is the difference in the GNSS/GPS receiver clock error between the wireless device and the base station at the first point in time, $\Delta N_{b,r}$ is a difference in an integer ambiguity between the wireless device and the base station, and $\Delta \epsilon_{\Phi_{b,r}}$ is a difference in the measurement noise and multipath associated with wireless device CP measurements and base station CP measurements.

8. The apparatus of claim 7, wherein to calculate the biased ambiguity, the at least one processor, individually or in any combination, is configured to calculate the biased ambiguity at the first point in time based on:

$$\lambda \cdot \Delta N_{b,r} = \Delta \Phi_{b,r}(t_0) - [\Delta \rho_{b,r}(t_0) + \Delta dT_{b,r}(t_0)].$$

9. The apparatus of claim 8, wherein the carrier phase measurement at the second point in time ($t_i$) for each of the plurality of satellites after applying the biased ambiguity is:

$$[\Delta \Phi_{b,r}(t_i) - \lambda \cdot \Delta N_{b,r}] = \Delta \rho_{b,r}(t_i) + \Delta dT_{b,r}(t_i) + \Delta \epsilon_{\Phi_{b,r}},$$

wherein: ($t_i$) is the second point in time, $\Delta \Phi_{b,r}(t_i)$ is a difference in CP measurements between the wireless device and the base station at the second point in time, $\Delta \rho_{b,r}(t_i)$ is a difference in geometry range measurements between the wireless device and the base station at the second point in time, $\Delta dT_{b,r}(t_i)$ is a difference in the GNSS/GPS receiver clock error between the wireless device and the base station at the second point in time, and $\Delta \epsilon_{P_{b,r}}$ is the difference in the measurement noise and multipath associated with wireless device CP measurements and base station CP measurements.

10. The apparatus of claim 1, wherein the wireless device is a user equipment (UE) or a rover device.

11. The apparatus of claim 1, wherein the relative location of the wireless device is associated with the carrier phase measurement and a pseudo-range measurement.

12. A method of wireless communication at a wireless device, comprising:
   receiving, via a global navigation satellite systems (GNSS) or global positioning system (GPS) (GNSS/GPS) receiver, a first set of signals from a plurality of satellites at a first point in time;
   calculating a raw pseudo-range (PR) and a raw carrier phase (CP) for each of the plurality of satellites based on the reception of the set of signals at the first point in time;
   receiving, from a base station via a transceiver of the wireless device, correction information associated with the plurality of satellites;
   applying the correction information to the raw PR and the raw CP to estimate a biased wireless device position and a GNSS/GPS receiver clock error for the plurality of satellites;
   calculating a biased ambiguity based on the biased wireless device position and the GNSS/GPS receiver clock error, and a difference in CP measurements between the wireless device and the base station for each of the plurality of satellites;
   applying the calculated biased ambiguity to a carrier phase measurement associated with a second set of signals received from each of the plurality of satellites at a second point in time; and
   determining, upon applying the calculated biased ambiguity to the carrier phase measurement for each of the plurality of satellites, a relative location of the wireless device at the second point in time based on the biased ambiguity for all of the plurality of satellites.

13. The method of claim 12, wherein the correction information includes correction data for at least one of a satellite orbit, a satellite clock, or an atmospheric error.

14. The method of claim 12, wherein the raw PR is calculated based on:

$$P_r = \rho_r + dT_r - dt + d\text{Trop}_r + d\text{Iono}_r + \epsilon_{P_r},$$

wherein: $P_r$ is a PR measurement between the wireless device and the plurality of satellites, $\rho_r$ is a geometry range between the wireless device and the plurality of satellites, $dT_r$ is the GNSS/GPS receiver clock error, $dt$ is a satellite clock error, $d\text{Trop}_r$ is a tropospheric error, $d\text{Iono}_r$ is an ionospheric error, and $\epsilon_{P_r}$ is a measurement noise and multipath associated with the raw PR.

15. The method of claim 14, wherein the raw CP is calculated based on:

$$\Phi_r = \rho_r + dT_r - dt + d\text{Trop}_r - d\text{Iono}_r + \lambda \cdot N_r + \epsilon_{\Phi_r},$$

wherein: $\Phi_r$ is a CP measurement between the wireless device and the plurality of satellites, $\rho_r$ is the geometry range between the wireless device and the plurality of satellites, $dT_r$ is the GNSS/GPS receiver clock error, $dt$ is the satellite clock error, $d\text{Trop}_r$ is the tropospheric error, $d\text{Iono}_r$ is the ionospheric error, $\lambda$ is a wavelength, $N_r$ is an integer ambiguity, and $\epsilon_{\Phi_r}$ is a measurement noise and multipath associated with the CP measurement.

16. The method of claim 15, wherein the relative location of the wireless device is determined before the integer ambiguity is converged.

17. The method of claim 14, wherein a difference in PR measurements between the wireless device and the base station at the first point in time ($t_0$) is calculated based on:

$$\Delta P_{b,r}(t_0) = \Delta \rho_{b,r}(t_0) + \Delta dT_{b,r}(t_0) + \Delta \epsilon_{P_{b,r}},$$

wherein: ($t_0$) is the first point in time, $\Delta P_{b,r}$ is the difference in PR measurements between the wireless device and the base station at the first point in time, $\Delta \rho_{b,r}(t_0)$ is a difference in geometry range measurements between the wireless device and the base station at the first point in time, $\Delta dT_{b,r}(t_0)$ is a difference in the GNSS/GPS receiver clock error between the wireless device and the base station at the first point in time, and $\Delta \epsilon_{P_{b,r}}$ is a difference in the measurement noise and multipath associated with wireless device PR measurements and base station PR measurements.

18. The method of claim 17, wherein the difference in CP measurements between the wireless device and the base station at the first point in time is calculated based on:

$$\Delta \Phi_{b,r}(t_0) = \Delta \rho_{b,r}(t_0) + \Delta dT_{b,r}(t_0) + \lambda \cdot \Delta N_{b,r} + \Delta \epsilon_{\Phi_{b,r}},$$

wherein: $\Delta \Phi_{b,r}(t_0)$ is the difference in CP measurements between the wireless device and the base station at the first point in time, $\Delta \rho_{b,r}(t_0)$ is a difference in geometry range measurements between the wireless device and the base station at the first point in time, $\Delta dT_{b,r}(t_0)$ is a difference in the GNSS/GPS receiver clock error between the wireless device and the base station at the first point in time, $\Delta N_{b,r}$ is a difference in an integer ambiguity between the wireless device and the base station, and $\Delta \epsilon_{\Phi_{b,r}}$ is a difference in measurement noise and multipath associated with wireless device CP measurements and base station CP measurements.

19. The method of claim 18, wherein the biased ambiguity at the first point in time is calculated based on:

$$\lambda \cdot \Delta N_{b,r} = \Delta \Phi_{b,r}(t_0) - [\Delta \rho_{b,r}(t_0) + \Delta dT_{b,r}(t_0)].$$

20. The method of claim 19, wherein the carrier phase measurement at the second point in time $(t_i)$ for each of the plurality of satellites after applying the biased ambiguity is:

$$[\Delta \Phi_{b,r}(t_i) - \lambda \cdot \Delta N_{b,r}] = \Delta \rho_{b,r}(t_i) + \Delta dT_{b,r}(t_i) + \Delta \epsilon_{\Phi_{b,r}},$$

wherein: $(t_i)$ is the second point in time, $\Delta \Phi_{b,r}(t_i)$ is a difference in CP measurements between the wireless device and the base station at the second point in time, $\Delta \rho_{b,r}(t_i)$ is a difference in geometry range measurements between the wireless device and the base station at the second point in time, $\Delta dT_{b,r}(t_i)$ is a difference in the GNSS/GPS receiver clock error between the wireless device and the base station at the second point in time, and $\Delta \epsilon_{P_{b,r}}$ is the difference in the measurement noise and multipath associated with wireless device CP measurements and base station CP measurements.

21. The method of claim 12, wherein the wireless device is a user equipment (UE) or a rover device.

22. The method of claim 12, wherein the relative location of the wireless device is associated with the carrier phase measurement and a pseudo-range measurement.

23. An apparatus for wireless communication at a wireless device, comprising:
  means for receiving, via a global navigation satellite systems (GNSS) or global positioning system (GPS) (GNSS/GPS) receiver, a first set of signals from a plurality of satellites at a first point in time;
  means for calculating a raw pseudo-range (PR) and a raw carrier phase (CP) for each of the plurality of satellites based on the reception of the set of signals at the first point in time;
  means for receiving, from a base station via a transceiver of the wireless device, correction information associated with the plurality of satellites;
  means for applying the correction information to the raw PR and the raw CP to estimate a biased wireless device position and a GNSS/GPS receiver clock error for the plurality of satellites;
  means for calculating a biased ambiguity based on the biased wireless device position, and the GNSS/GPS receiver clock error, and a difference in CP measurements between the wireless device and the base station for each of the plurality of satellites;
  means for applying the calculated biased ambiguity to a carrier phase measurement associated with a second set of signals received from each of the plurality of satellites at a second point in time; and
  means for determining, upon applying the calculated biased ambiguity to the carrier phase measurement for each of the plurality of satellites, a relative location of the wireless device at the second point in time based on the biased ambiguity for all of the plurality of satellites.

24. The apparatus of claim 23, wherein the correction information includes correction data for at least one of a satellite orbit, a satellite clock, or an atmospheric error.

25. The apparatus of claim 23, wherein the wireless device is a user equipment (UE) or a rover device.

26. The apparatus of claim 23, wherein the relative location of the wireless device is associated with the carrier phase measurement and a pseudo-range measurement.

27. A non-transitory computer-readable medium storing computer executable code at a wireless device, the code when executed by a processor causes the processor to:
  receive, via a global navigation satellite systems (GNSS) or global positioning system (GPS) (GNSS/GPS) receiver, a first set of signals from a plurality of satellites at a first point in time;
  calculate a raw pseudo-range (PR) and a raw carrier phase (CP) for each of the plurality of satellites based on the reception of the set of signals at the first point in time;
  receive, from a base station via a transceiver of the wireless device, correction information associated with the plurality of satellites;
  apply the correction information to the raw PR and the raw CP to estimate a biased wireless device position and a GNSS/GPS receiver clock error for the plurality of satellites;
  calculate a biased ambiguity based on the biased wireless device position, the GNSS/GPS receiver clock error, and a difference in CP measurements between the wireless device and the base station for each of the plurality of satellites;
  apply the calculated biased ambiguity to a carrier phase measurement associated with a second set of signals received from each of the plurality of satellites at a second point in time; and
  determine, upon applying the calculated biased ambiguity to the carrier phase measurement for each of the plurality of satellites, a relative location of the wireless device at the second point in time based on the biased ambiguity for all of the plurality of satellites.

* * * * *